United States Patent [19]
Carney et al.

[11] Patent Number: 5,630,137
[45] Date of Patent: May 13, 1997

[54] CONDITION HANDLING IN A MULTI-LANGUAGE COMPUTER PROGRAM

[75] Inventors: William P. Carney, San Jose, Calif.; Ralph O. Conder, Deerfield Beach, Fla.; Laurence E. England, Morgan Hill, Calif.; Jeffrey A. Grantz, Boca Raton, Fla.; Daniel R. Hicks, Byron, Minn.; George Lausman, North York, Canada; Robert M. Smith, Morgan Hill, Calif.; William N. J. Tindall, Toronto, Canada

[73] Assignee: International Business Machines Corporation, Armonk, N.Y.

[21] Appl. No.: 387,494

[22] Filed: Feb. 13, 1995

Related U.S. Application Data

[63] Continuation of Ser. No. 755,706, Sep. 6, 1991, abandoned.

[51] Int. Cl.⁶ ............................................. G06F 9/46
[52] U.S. Cl. .................................... 395/678; 395/500
[58] Field of Search .............................. 395/500, 650, 395/700

[56] References Cited

U.S. PATENT DOCUMENTS

| | | | |
|---|---|---|---|
| 3,665,421 | 5/1972 | Rehhausser et al. | 395/250 |
| 3,794,980 | 2/1974 | Cogar et al. | 395/375 |
| 4,041,462 | 8/1977 | Davis et al. | 364/775 |
| 4,128,878 | 12/1978 | Yasuhara et al. | 395/375 |
| 4,240,137 | 12/1980 | Matsumoto et al. | 395/375 |
| 4,488,227 | 12/1984 | Miu et al. | 395/375 |
| 4,564,903 | 1/1986 | Guyette et al. | 395/411 |
| 4,733,346 | 3/1988 | Tanaka | 395/375 |
| 4,768,149 | 8/1988 | Konopik et al. | 395/867 |
| 4,811,208 | 3/1989 | Myers et al. | 395/800 |
| 4,835,685 | 5/1989 | Kun | 395/650 |
| 4,862,351 | 8/1989 | Green et al. | 395/375 |
| 4,980,820 | 12/1990 | Youngblood | 395/868 |
| 4,992,971 | 2/1991 | Hayashi | 395/375 |
| 5,027,273 | 6/1991 | Letwin | 395/411 |
| 5,097,533 | 3/1992 | Burger et al. | 395/500 |
| 5,103,498 | 4/1992 | Lanier et al. | 395/68 |
| 5,220,669 | 6/1993 | Baum et al. | 395/775 |
| 5,305,455 | 4/1994 | Anschuetz et al. | 395/700 |

*Primary Examiner*—Parshotam S. Lall
*Assistant Examiner*—Viet Vu
*Attorney, Agent, or Firm*—Marilyn Smith Dawkins

[57] ABSTRACT

A condition handling method and means capable of handling programs written in a plurality computer programming languages is created by a set of routines which implement the Common Condition Handling (CCH) function. These routines have entry points which are declared as external or entry variables which enables application programs to link to them. The compilers and application programs can then interact with the condition handling process by calling or branching to the entry points in the common condition handling code when the program is executing. Language specific condition handling routines and user condition handlers are invoked using a last-in-first-out (LIFO) queue to associate the handlers with the current stack frame. Any handler may respond to the CCH with one of three types of requests: Resume, Percolate, and Promote. A separate means is provided for registering Exit Handlers and to move the resume cursor.

48 Claims, 9 Drawing Sheets

LOGICAL CONDITION HANDLING QUEUE FOR ROUTINE WITH IN-LINE LIBRARY ROUTINE (VIRTUAL STACK FRAME)

```
              3  33 3 3 3 3 4            6 6            9 6
              1  23 4 6 7 9 0            3 4            6 6
            ┌──┬──┬─┬─┬─┬────────────┬──────────┐
            │  │A │B│C│ │ Facility_ID│ I_S_Info │
            └──┴──┴─┴─┴─┴────────────┴──────────┘
            0
            Condition_ID
```

A = Case
B = Severity
C = Control

Case of Condition_ID are:

```
                 1 1          3
                 5 6          1
Case 1      ┌────────┬──────────┐
            │ MsgSev │  Msgno   │
            └────────┴──────────┘
            0

1 1          3
                 5 6          1
Case 2      ┌────────────┬────────────┐
            │ Class_Code │ Cause_Code │
            └────────────┴────────────┘
            0
```

FIG. 9

CONDITION HANDLING IN A MULTI-LANGUAGE COMPUTER PROGRAM

RELATED APPLICATION

This application is a continuation of U.S. patent application No. 07/755,706, filed Sep. 6, 1991, now abandoned.

The present application is related to an application filed on the same date titled "METHOD AND SYSTEM FOR REPRESENTING AND SIGNALING RUN-TIME PROGRAM CONDITIONS" bearing assignee's file number "SA9-91-039", now issued U.S. Pat. No. 5,455,949.

TECHNICAL FIELD

The present invention relates to methods and systems in the field of computerized data processing and specifically to the handling of conditions which arise during the execution of computer programs.

BACKGROUND OF THE INVENTION

Computer systems generally have hardware and software mechanisms which are used in combination to detect and appropriately respond to conditions which arise during the execution of programs. The terms condition and exception are often used interchangeably. These conditions or exceptions may be errors such as using an invalid machine address or attempting to divide by zero. Conditions also include events which may not be actual errors, but which require special attention. Examples of this type of condition might include an attempt to reference an uninitialized variable. Hardware detected conditions generally cause the CPU to stop executing the program which caused the condition through a hardware interrupt mechanism. The low level software or firmware interrupt handlers in the system will initially be given control. Control may then be passed up through the various layers of programs currently executing such as an operating system, a run-time environment program, and an application program through software branching and calling techniques. Software detected conditions generally result in the calling of routines which have been designated as condition handlers. When a program causes a condition handler to be executed, the program is said to signal a condition.

A condition is defined as any synchronous event that may need to be brought to the attention of an executing program or of language routines supporting that program. Conditions may originate from an of the following:

Hardware-detected errors (known as program interruptions in IBM System/370 terminology) are signalled by the central processing unit. The condition codes are derived from those defined for the machine on which the program is executing.

Operating system and subsystem detected errors (exceptions) are software errors, which are reported to the user as ABENDs on IBM'S MVS and VM operating systems.

A software-generated signal is a condition which is intentionally and explicitly created by an application program. The condition may be unique to the application or may be used to simulate one of the other classes of conditions. The signal may be communicated (generated and received) within the same language or between different languages. Software-generated signals are handled in the same manner as conditions detected by the hardware or operating system. Operating systems, language library routines, application programs, and subordinate condition handlers may produce software-generated signals.

Some of the system's condition handlers may always be the same while others may change dynamically according to what type of operating system routine or application program is running at the time. It is common for high level languages (HLL) compilers, such as FORTRAN, PL/I. etc., to provide what is called a run-time environment (RTE) for application programs written in their HLL. The RTE may provide routines which interface with the operating system to capture control when certain conditions occur and may allow the application program to setup user routines to which control will be transferred for certain conditions. The distinction between functions provided by an operating system and by an RTE is largely arbitrary. An operating system could provide all of the same functions as an RTE and thereby obviate the need for a separate RTE.

The following terms are used in this specification:

CEECIB
  A variable where certain global status information is stored.

Condition Severity Codes
  will be used ranging from 0 to 4 with 0 being the least severe.

Condition Manager
  is any program or means which gains control of the computer system when a condition occurs and which manages the handling of that condition by executing various system and/or user application routines. It may be part of the operating system, run-time environment or an application program.

Cursor
  is an address pointer that points to an executable instruction.

Debugger
  is a program which is used to execute an application program under test conditions so that errors may be found.

Handle Cursor
  is the cursor that indicates both the handling routine and the stack frame for which the handler is invoked.

Enablement
  is the capability to intercept a condition before presentation to any other condition handler, and to determine whether the condition should be ignored or not. Unrecognized conditions are always defined to be enabled. Normally, enablement is used to supplement the hardware for capabilities that it does not have and for language enforcement of the language's semantics. An example of supplementing the hardware is the specialized handling of floating-point overflow exceptions based on language specifications (on some machines this can be achieved through masking the exception).

Enclave
  is a collection of a main routine and zero or more subroutines. The main routine is executed first. Threads originate in enclaves.

INT2 and INT4
  will be used as part of C syntax interface definitions to mean two byte and four byte integers respectively.

Platform
  is the combination of an operating system and computer hardware on which programs may execute.

Resume Cursor
  is the cursor designating the point in the application where execution can be restarted.

Resume
  is the termination of condition handling, and the transfer of control to the instruction and stack frame denoted by the Resume Cursor.

Safe Condition is any condition which may be ignored if they are not handled.

Stack Frame is the set registers and condition flags which are pushed onto the computer's stack when an interrupt occurs or registers are saved for a call or branch.

Stack Frame Zero is the conceptual stack frame immediately prior to the stack frame for the first routine. It is the theoretical place where the thread or task is initialized, the first procedure is called from and termination is initiated from. For the purposes of condition handling, the zeroth stack frame is the frame at which the default actions for a language are applied.

Thread is the term for the basic line of execution in a routine.

The immediate function of any condition handling mechanism in a system is to diagnose errors, and then selectively report and/or tolerate them, possibly after restoring some data values. These actions are taken to solve specific problems within the system and to permit the system to meet its objectives. Historically, condition processing in High-Level Languages was implemented as appropriate for the objectives of each individual programming language. Not surprisingly, these individual implementations are different from each other, and in fact are often mutually destructive when used together in the same application.

In the prior art condition handling is performed based on the source language of the program being executed. Thus, a program generated using a COBOL compiler will use one set of condition handling routines while programs written in PL/I use a different set. Given the desirability and need to support an arbitrary mix of High-Level Languages in an application, it is essential to develop a condition handling model that manages this mixed environment as well as the single-language environment. A basic requirement is to meet the standard for each individual language. Any application implemented entirely within one language must operate as specified in that language's external standard. Without this, a condition handling model is not viable at all.

Next, it is important to provide behavior for a mixed-language application that is rational, understandable, and predictable. In effect, this defines a new "standard" for mixed-language applications. Currently, there is no recognized standard for these environments. The need is to support such applications with a consistent condition handling model no matter what the language combinations may be. At the same time, the condition handling model must not prevent the languages from meeting their standards as far as possible in mixed-language situations.

Programmer-specified condition handlers should be able to get control for all "recoverable" conditions (other than those conditions which are indicated via some sort of return code mechanism instead) regardless of what source language is being used to write the program. It should be possible for a programmer to design a "subroutine" so that it is insulated from the condition handling characteristics of its caller. This subroutine may consist of many subroutines and/or functions used together as a unit. It should be possible for a programmer to use a well-designed subroutine without the need to be concerned about its internal condition handling mechanisms or the applications that may be contained therein. It should be possible for one well-designed subroutine to be substituted for an equivalent one written in a different language without causing any differences (including but not limited to condition handling) visible to the caller. This does not mean that language semantics will be changed in any way. The programmer must have at his disposal mechanisms which are reasonably independent of any global condition handling scheme which a particular language may implement. A single-language application which uses only the language-defined interfaces for condition handling should behave according to the language specification, including any global condition handling effects.

One aspect of predictability that needs to be explicitly stated is where execution can resume after a condition is successfully handled (i.e., "tolerated"). When condition handling is used to accomplish backout and state restoration, the ability of a condition handler to force execution to resume at an arbitrary location in an arbitrary subroutine can be extremely dangerous. This is because one condition handler may perform backout operations (including, for example, releasing locks) on the assumption that the procedure that incurred the condition will not continue executing. If a later condition handler then decides to resume at the point of the condition, results are unpredictable at best. Thus, once a condition handler has determined that a particular invocation (level of call) cannot continue normal execution, it must be possible to perform backout for that invocation without a danger that a later condition handler may reverse the decision and resume execution in the invocation.

All HLL condition handlers should be prepared to diagnose the condition if they are the condition handler for the stack frame in which the condition occurred. The further one gets from this stack frame, the less information is available to do that diagnosis. If the resume cursor is moved past this stack frame, all information is lost. Therefore, all diagnosis must be done before any condition handling or condition toleration is begun.

Currently existing HLL compilers provide a varying degree of user access to condition handling mechanisms. The PL/I language has a relatively powerful set of ways that a user can tap into the condition handling process through the use of "ON-condition". The COBOL language on the other hand has virtually no mechanism to allow the user to get control when conditions occur. There are a large number of computer programming languages available today. It would be a cumbersome solution to require that the language syntax of these compilers be modified in any major way to provide for built-in user access to condition handling.

Current implementations of language specific condition handling provide for the existence of handlers which can be passed a parameter which determines whether the handler will actually handle the condition or simply report on whether the condition is enabled.

What is needed and not provided in the prior art is a general mechanism for condition handling which can function in a multi-language environment and satisfy the needs outlined above. Specifically the prior art does not provide:

a linkable set of condition handling routines which are accessible to the user regardless of what source language is being used;

a mechanism for altering the type of condition being processed without invoking the entire condition handling mechanism from the beginning for the new condition;

a method or means for separating condition handling from routine termination of a procedure upon completion;

a method or means for providing a controlled mechanism for changing the point at which execution of the code can resume after a condition has been successfully handled.

SUMMARY OF THE INVENTION

The invention is a computer system and method for condition handling capable of handling programs written in a plurality of computer programming languages. A set of routines is compiled to implement the common condition handling (CCH) function. Compilers are modified to interact with the CCH and to create code to interact with the CCH. The CCH routines have entry points which are declared as external or entry variables which enables application programs to link to them. The application programs can then interact with the condition handling process by calling or branching to the entry points in the CCH when the program is executing. The CCH initializes the computer system's standard condition processing means to turn over control of the computer system to the CCH when selected conditions occur. The languages in which the program is written should preferably be modified to each have a language condition handling routine specific to that computer programming language. When the program, procedure or subroutine written in that language is entered, the CCH records that fact using a last-in-first-out (LIFO) queue or equivalent means to associate the language specific handlers (LSH) with the current stack frame. Thus, when multiple nested routines are processed, the CCH creates an ordered list of the LSH's so that it can determine which LHS is to be executed when specified conditions occur. The application program optionally registers User Handlers by invoking (calling) one of the external entry points of CCH. The User Handlers are also queued LIFO and associated with a current stack frame. When a condition is detected, the LSH last registered, i.e., the one on the top of the queue, is executed with a request that the condition be checked for enablement. The LSH does not process the condition at this point. If the LSH returns information indicating that the condition is not enabled then the CCH will cause the execution of the program to resume where the condition occurred. If the condition is enabled, then the last User Handler registered will be executed. The User Handler and any other Handlers may respond to the CCH with one of three types of requests: Resume, Percolate, and Promote. The Resume Request indicates that the condition was handled and no further processing needs to occur. If the User Handler Percolates or Promotes the condition, the CCH will execute the next User Handler on the queue. Once all of the User Handlers have been executed, the last entered LSH will be executed. It can also respond with one of three requests. If all of the Handlers associated with a stack frame have been executed and none has handled the condition, then the Handlers for the next oldest stack frame will be executed. A logical stack frame zero is maintained which may have a LSH associated with it. The CCH has its own condition handler associated with stack frame zero. When a routine completes its stack frame is released and the associated handlers are removed from the queue.

The Promote Request requests that the condition be redefined as another condition. The Percolate Request requests that the condition be reprocessed by a second condition handling routine. The Resume Request requests that execution be resume in the code at the point indicated by the Resume Cursor because the condition has been handled. The CCH then processes the Promote, Percolate or Resume request by performing the requested action. In addition, a Resume Cursor is maintained which may be moved (changed) at the request of the Handlers.

A separate means is provided for registering Exit Handlers, so that the Condition Manager does not concern itself with normal exit handling. This separation allows it to satisfy existing language requirements while simultaneously allowing the implementation of a more powerful and robust mechanism. In particular, it is the separation of exit handling that provides the basis for "rollback," and the restoration of data integrity.

A Handler may request termination of the thread, enclave or program in which the condition occurred by calling a routine in the CCH.

BRIEF DESCRIPTION OF THE DRAWINGS

FIG. 9 is a block diagram of a Condition Token.

PREFERRED EMBODIMENT

Figure 1:
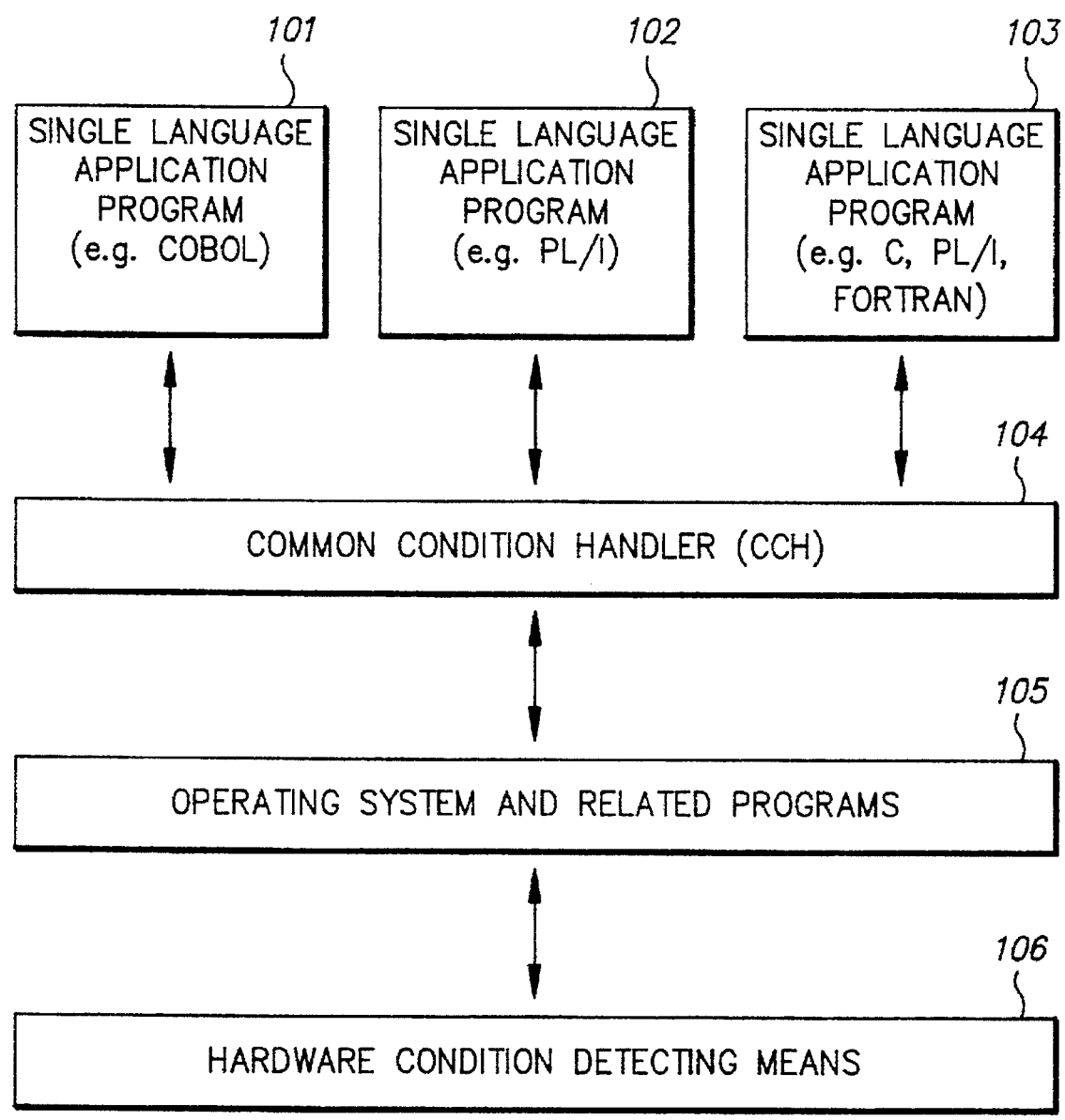
FIG. 1 shows the functional relationship of the CCH between the operating system and the application programs.

A set of compilers, a Common Condition Handler (CCH) including a Condition Manager and a set of callable services are created to fully implement the invention. CCH is part of a larger common run-time environment for application programs which may be written in multiple High-Level Languages (HLL). FIG. 1 shows the global position of CCH in the computer systems software (of firmware) hierarchy. The compilers themselves and the code produced by the compilers for application programs interface with the CCH. The lowest levels in the system are the hardware condition detecting means 106 and the operating system 105. As used herein the operating system includes programs which in IBM's MVS operating system are called subsystems. The CCH 104 interfaces between the operating system and the application programs 101–103. The complete run-time environment will be called the Common Execution Environment (CEE). The CEE runs in the problem state as a program separate from the operating system, but as noted it can easily be included as part of the operating system without essential modification being required. A Condition Model will be defined. The Condition Manager implements the Condition Model.

Figure 2:
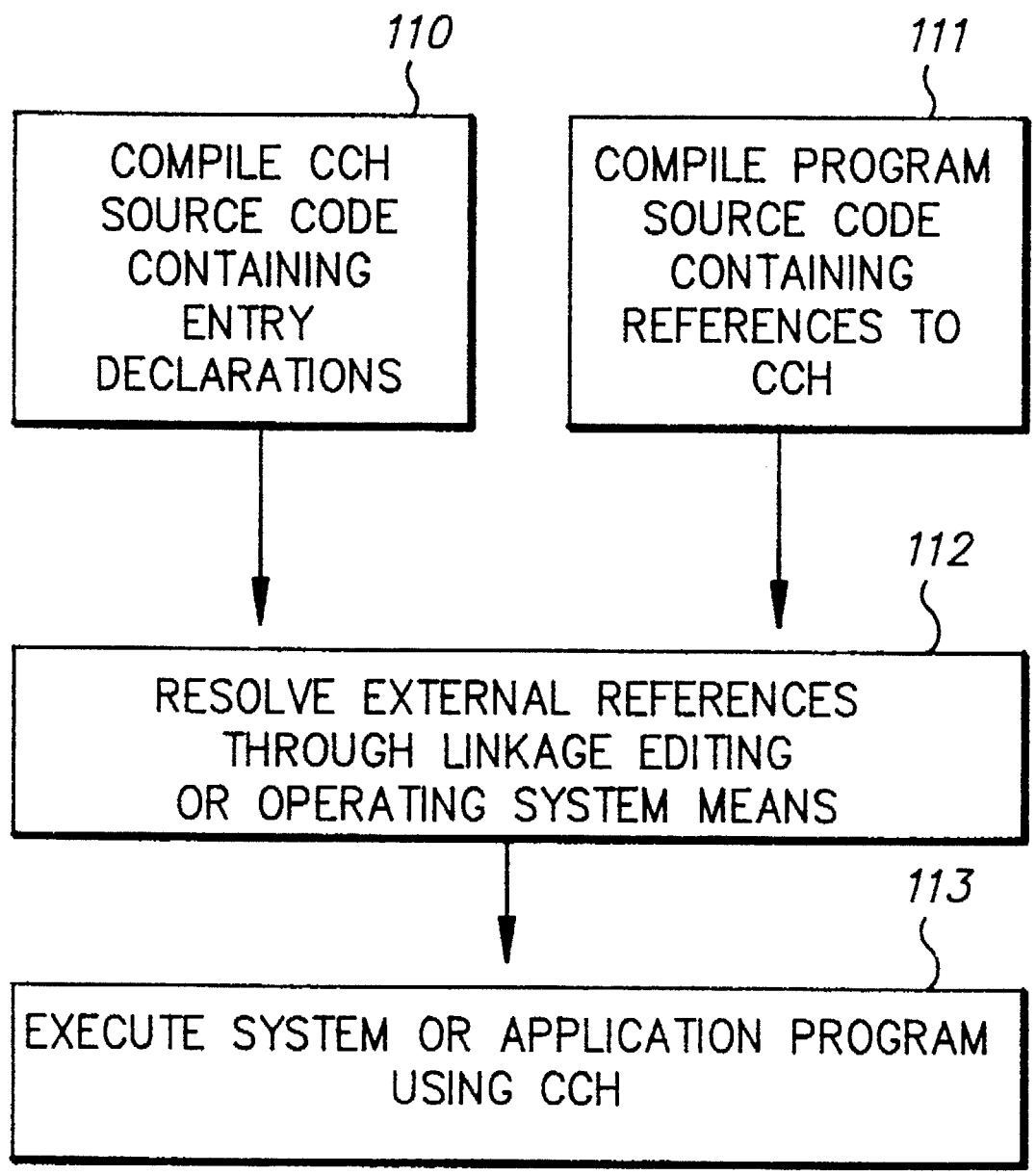
FIG. 2 shows the method of linking the application program and CCH.

As is conventional in the art, callable routines in the CEE will be assigned label names such as CEEHDLR. Compilers and other programs can be written to link to and use the services provided by CEE regardless of their source languages. FIG. 2 shows that CCH itself 110 and the application programs 111 are written with entry or external label declarations using standard programming techniques. These external references are resolved by the use of built-in operating system means or a standard linkage editor 112. CCH would typically be compiled into linkable object code by the system software producer and sold to an application or compiler writer as object code only. Thus, in the typical case, a user will execute step 111 and 112 and step 110 will have been performed previously by the CCH producer. Operating systems have various ways of loading and executing code similar to the CCH. For example, IBM's MVS operating system uses a link pack area (LPA) and dynamically copies the code from CCH into the user's address space only upon demand. Any mechanism provided by the particular operating system being used for linking will work.

The CCH handles conditions in the CEE run-time environment for high-level language compilers, debuggers, and assembler language user routines that adhere to the protocol required to interface with the Condition Manager. Applications, language library routines, and debuggers establish exits which the Condition Manager may invoke when a condition occurs. These exits are called subordinate condition handlers.

The Condition Manager discussion herein assumes the IBM operating system run-time option setting of TRAP (ON), except where noted.

The Condition Manager supports any of the following subordinate condition handlers:

Condition handler in the library of a language
Condition handler which is part of an application
Condition handler which is part of a debugging system The functions provided by the Condition Manager are listed below. In general, the Condition Manager performs all of the steps listed. Some steps may be omitted or repeated depending on the condition.

Intercepting system interrupts.

System interrupts are intercepted by the Condition Manager using operating system specific exits and interfaces. Program exceptions, system ABENDs, and software-detected conditions, are all monitored by the Condition Manager.

Gathering information on a condition.

The Condition Manager gathers information about a condition. The information collected is a record of the condition.

Screening conditions (interrupts and exceptions).

Condition Manager ignores a condition (resumes execution at the instruction following the place where it occurred) if a language so requests. Certain languages may not want to treat an interrupt or an exception as a condition because of the semantics of the language.

Calling subordinate condition handlers.

The Condition Manager calls those routines that have been established as subordinate condition handlers. The subordinate condition handlers provide return codes to the Condition Manager indicating the action to be taken.

Terminating for conditions that are not correctable.

If the subordinate condition handlers are unable to tolerate or correct the error, then the Condition Manager performs one of the following based on the severity of the condition.

Resume execution ('safe' conditions only)
Terminate the thread (all other conditions)

User externals provided by the Condition Manager do not replace the prior condition handling user externals supplied in each language product. This, allows unmodified applications to run as before. The CCH is intended to provide a common condition handling base for products.

Using the condition handling primitives provided by CCH, each HLL can enforce its own condition handling semantic actions.

Transition to CCH-enabled versions of a language should be invisible to the single-language user, but the single-language user may want to make modifications to take advantage of the more powerful condition handling available under CCH. Applications written in multiple languages, however, may behave differently under CCH.

The basic Condition Manager has the following characteristics:

The appropriate condition handling action is determined based on the characteristics of the invocation (level of call) that incurred the condition.

A means is provided for a condition handler to promote a condition, i.e., convert it into a new condition with a different meaning. This may be based on the handler's knowledge of the original condition's cause, or the lack thereof in the case of PL/I promoting an unhandled condition at stack frame zero to ERROR and resetting the handle cursor to the resume cursor. There is an implication here that this new condition is presented to a condition handler. There is some latitude for defining which handler should be presented with the new condition, given the ability described below to modify the handling order.

A means is provided to allow condition handling for an invocation to be percolated (or deferred) to the handler for the calling invocation. This process may be repeated through multiple invocations within the thread.

A condition handler can request termination of the thread by calling CEEEXTD.

Condition handlers may incur conditions and have defined handlers for them.

The condition handling for an invocation is logically separated into handling actions and exit actions. These two different actions may occur at different times. An HLL termination exit routine is associated with a stack frame, thus allowing processing to be performed on behalf of that stack frame if it is prematurely terminated during either condition processing or GOTO out of block processing.

An HLL specific condition handler, which may be null, is associated with each stack frame and is supplied by the language implementers. These handlers should be supplied in object code form and stored on disk, tape or any other persistent form of memory so that they can be used repeatedly in the execution of user programs created using the associated compilers. Each unique compiler should have its own language specific handler. Each handler must be structured to conform to the architecture described below and should utilize the Resume, Percolate and Promote functions of the CCH as well the other functions of the CCH.

A queue for user condition handlers is provided for each stack frame. This queue has entries inserted into it by use of the CCH callable service CEEHDLR from within the stack frame for which the condition handler is to run. Condition handlers are removed by calling CEEHDLU. This queue may be empty.

When a stack frame is exited, all condition handlers associated with the stack frame are implicitly cancelled.

There should be default condition handling actions defined for all conditions that are not handled by an High-Level Language or user condition handler. The exact defaults chosen are not as important as is the need that these defaults be made known to the compiler and aplication writers so that decisions can be made as to when the defaults will achieve a desired result and when special handlers are needed. One logical way to architect the defaults is to have the Condition Manager resume on safe conditions and terminate the threads for all others.

The "Two-Cursor Model"

The invention's execution environment condition handling model is most readily described in terms of the two-cursor model. This model envisions the invoked procedures of an application as residing in a last-in-first-out (LIFO) stack, with two pointers (or "cursors") pointing at various levels of the stack.

The two-cursor model assumes that some condition handling information is logically associated with each stack frame. With the two-cursor model, two pointers into the stack are used (at least conceptually) to keep track of the state of condition handling:

The handle cursor points at a specific handler within the stack frame whose condition handling actions are to be performed next. Initially, the handle cursor points to the first handler within the stack frame where an exception occurred, or from which a detected condition was signalled. As condition handling progresses, the handle cursor moves to later handlers within the frame or to the first handler in the calling frame. Condition handlers have some latitude to set the handle cursor to a handler other than the next in sequence.

The resume cursor points at the stack frame and instruction within the block where execution would resume if a condition handler decides that it is appropriate to resume execution. The resume cursor also includes the platform-specific machine state for that instruction. Initially the resume cursor is positioned at or after the machine instruction that caused the exception, or after the call to CEESGL that signalled the condition. Condition handlers can subsequently set the resume cursor to a label or return point in an earlier stack frame.

The actions of resume, percolate, and promote are now defined in terms of these two cursors:

resume is the termination of condition handling, and the transfer of control to the instruction and stack frame denoted by the resume cursor. The subordinate condition handlers can modify the resume cursor by using the CEEMRCR callable service.

percolate is the deferral of condition handling for an unchanged condition. The condition handler can set the handle cursor to continue condition handling in one of two places:

1. at the next handler in the invocation queue for the current stack frame
2. at the first condition handler in the queue for the next (calling) stack frame promote is the transformation of a condition to another condition, and the continuation of condition handling by setting the handle cursor to one of three places:

1. at the next handler in the invocation queue for the current stack frame
2. at the first condition handler in the queue for the next (calling) stack frame
3. at the first handler for the current stack frame (re-driving these handlers)

The condition handling information associated with a stack frame logically includes handlers for several distinct phases of the overall handling process. The handling functions include:

A language-specific "enablement" handling function. (Note that system-specific "enablement" handlers may exist but are invisible to this model.) One language specific enablement handler, which may be null, is associated with each stack frame. This routine is entered through the High-Level Language condition handler interface. In the preferred embodiment the enablement function is provided by the same routine which provides condition handling.

debugger condition handler. This handler is entered if the debugger is active or the condition severity meets or exceeds the TEST level.

CCH user condition handler. This handler is registered via the CEEHDLR interface. A queue of user condition handlers is associated with each stack frame. This queue may be empty. This routine is entered through the user condition handler interface. It may be unregistered via the CEEHDLU interface.

High-Level Language specific handler. This handler is able to service the language-specific user handlers such as PL/I "ON-condition" handlers. It also is capable of taking some default action if no High-Level Language or user handler fields the condition. One High-Level Language specific condition handler, which may be null, is associated with each stack frame. Unrecognized conditions must be "passed on" to the next condition handler unchanged. This routine is entered through the High-Level Language condition handler interface.

Termination exit routines. This routine specifies the actions to take when an invocation is abnormally exited. Since no current languages support explicit termination exit routines, these are languages supplied routines and CCH registered routines.

Unwinding is the action of calling all registered termination exit routines for a specified stack frame and then 'marking' the stack frame as non-active.

There are several important things to notice about the above list in comparison to traditional condition handling schemes. First, note that enablement handlers have been broken out as a conceptually separate category. As alluded to earlier, this is necessary to insure the cross-system consistency of condition handling. Second, the category of CCH user handlers has been added. This gives all language users access to condition handling, and it allows users of languages with existing condition models to access the full power and function of the invention's execution environment condition model.

One important aspect of the above list, however, is that it breaks out termination exit handling as a separate and distinct activity. In combination with the resume cursor, it is this separation of termination exit handling from the remainder of condition handling which is part of the invention.

Simple Demonstration of the Two-Cursor Model

Figure 3:
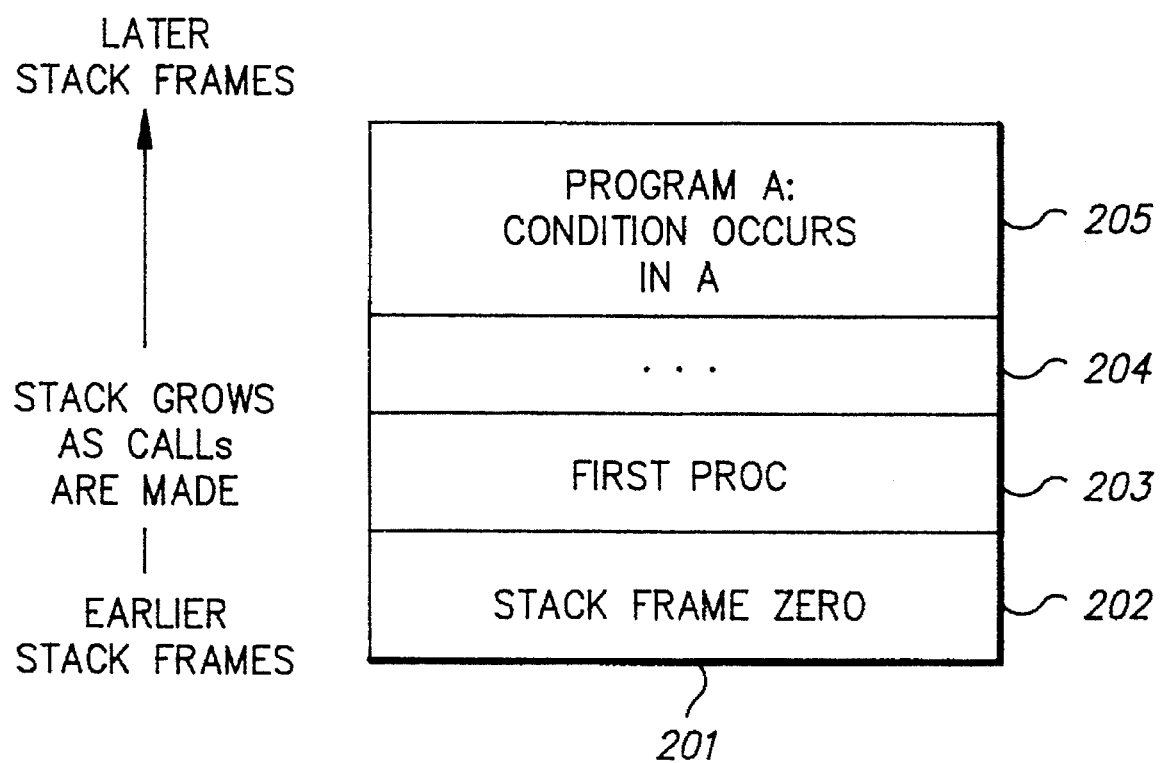
FIG. 3 illustrates the use of stack frames in CCH.
Figure 4:
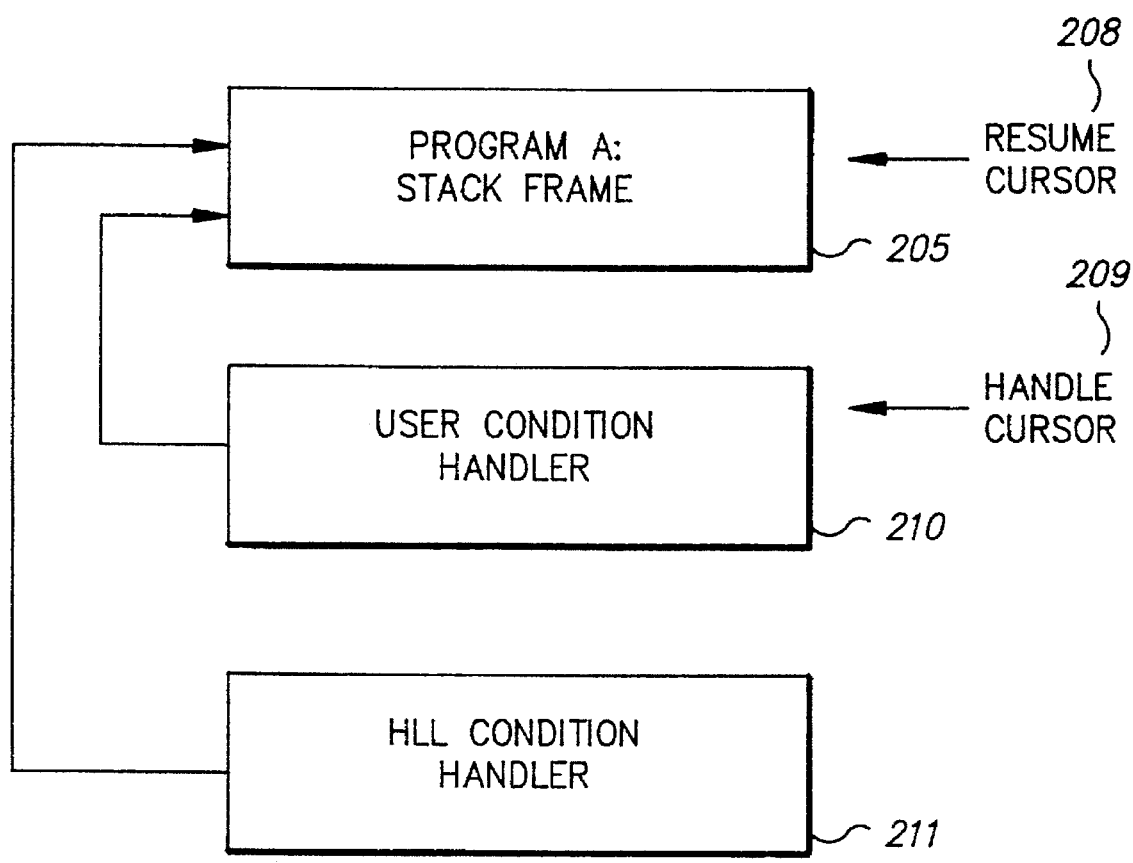
FIG. 4 illustrates the relationship between the Handlers, Cursors and a stack frame in CCH.

In its simplest form, the two-cursor model is explained with reference to the example of FIG. 3. The stack 201 is a commonly used way of storing data in the memory of the computer in a time sequence. The bottom of the stack as shown contains the oldest data and the newest data is on the top. The stack is composed of frames 202–205. Each frame contains a block of data including register values, instruction pointer and flags. FIG. 4 shows by way of example that that associated with Program A's stack frame are two condition handlers: a User Condition Handler 210 and an HLL Condition Handler 211. These handlers are not physically on the stack, but are associated with a stack frame because Program A has registered the User Handler with CCH and the HLL Handler was registered automatically when the Program was initialized. Programs interoperating with the CCH must, therefore, go through the CEE when the program is first initialized and when calling a subroutine written in a different language. How this is done is not critical for practicing the invention, but the information on the proper HLL Handler for each stack frame should be made available to CCH if its condition handling is to function correctly.

1. Assume that a condition occurs in the execution of Program A. The Condition Manager obtains control of the system from the operating system. The resume cursor 208 is set to point to Program A's stack frame 205. Program A is the invocation or the "owing" stack frame where the condition occurred. An "instruction address register" value associated with the resume cursor logically points at the instruction following the one that caused the condition or the one that caused the condition. The "environment" of the condition is also saved with the resume cursor.

2. The invocation pointed to by the handle cursor 209 is considered the "handling" invocation and is examined to determine what condition handlers have been specified. (Note that, in this discussion, we use the terms "handling invocation," "called invocation," and "calling invocation" to refer to the stack frames present at the time of the condition. We are not referring to the invocations of the condition handlers themselves.)

3. If the condition is a "fresh" one (i.e., it originated in the current invocation), the High-Level Language condition handler 211 is called for enablement. (Reason code "2" is used to indicate that the call is for an enablement check only as will be seen below). If the language recognizes the condition as "not a problem" then the routine is resumed.

4. The debugger will be called if it is active or the condition meets or exceeds the TEST level.

5. The user condition handlers associated with the invocation are executed in LIFO order for this stack frame until one of them handles it or until all have been visited. The Condition Manager will execute the User Condition Handler 210 first. The HLL Condition Handler 211 will be executed, when no user handler is present, or if user handler does not handle the condition. Reason code "1" is used to indicate that the call is for actual condition handling.

6. Any of the handlers may indicate to the Condition Manager that the condition is to be considered handled by returning a resume code as defined below. For conditions that are not handled, a handler may specify that the condition should be percolated (i.e., the same condition should be presented to a different condition handler), or should be promoted (i.e., a new condition should replace the old one and be presented to a different condition handler).

7. In the case of a percolated or promoted condition, the handler may also specify (within explicitly defined limits) how the handle cursor is to be modified in order to determine the next handler to invoke. It is incorrect to ever modify the handle cursor so that it points at a more recent stack frame in the stack than the resume cursor. The default action is to move the handle cursor "down" to the calling invocation (or the next handler within the current invocation if more than one is defined). The handle cursor is only moved by the Condition Manager.

8. In any of the above cases (resume, percolate, or promote), the condition handler may also specify how the resume cursor is to be modified. Modifying the resume cursor is restricted to "downward" motion only (i.e., from called invocation to calling invocation) and such modification always forces the execution of the termination exit handlers for those invocations which the cursor passes. Moving the resume cursor past an invocation also unregisters any associated condition handlers. (These actions actually occur only after the condition handler returns to the Condition Manager.) Modifying the resume cursor to point to the zeroth stack frame is not allowed.

9. In modifying the resume cursor, the handler may also modify the machine state (including but not limited to the next instruction address) associated with the resume cursor. One common modification would be to cause execution to resume at a particular location (label) in the invocation represented by the resume cursor. However, modifying the resume cursor to retry the failing instruction is not defined for IBM's OS/2 operating system. In most cases this is not possible. It is an error (though not necessarily a detected error) to modify the machine state so that execution would actually resume somewhere other than in the invocation indicated by the resume cursor.

The normal condition handling sequence traverses the stack from later stack frames toward earlier stack frames. If a condition has not been handled by the time that the stack has been traversed to stack frame zero, then the Condition Manager calls the High-Level Language condition handler for the zeroth stack frame. There is a specific indication that the handling is for stack frame zero. If the condition is still not handled after stack frame zero processing, then the Condition Manager default actions apply. The default action depends on the severity of the condition and whatever additional information is available. If any condition handler wishes to terminate the enclave instead of the thread, it must call CEETREN.

Presented below are some concepts that will be used throughout this set of examples. When a new stack frame is allocated upon entry of a routine, HLL condition handler is logically associated with the stack frame. The user may also optionally establish one or more additional condition handlers for that stack frame. When the routine returns to its caller, and the stack frame is deallocated, the HLL condition handler and the user-established condition handlers (if any exist) are dis-established.

The zero'th stack frame is the stack frame that precedes the stack frame for the first routine. The condition handling semantics associated with the zero'th stack frame are the default actions defined by the model.

If the calling sequence is Proc1 calling Proc2 calling Proc3 and, if a condition occurs while executing routine Proc3, Proc3's stack frame is known as the owning stack frame. That is, Proc3's stack frame owns the condition.

When a condition occurs, a stack frame is allocated for the Condition Manager. The condition handler for the stack frame that had the condition is called for the enablement step. If the response is, the condition is valid, the Condition Manager visits each stack frame, commencing with the owning stack frame and moving stack frame by stack frame towards the zero'th stack frame, until either the condition is handled (in some form) or the current invocation stack is exhausted. For each stack frame visited, the HLL condition handler associated with the stack frame is invoked so that the HLL error semantics may be enforced. (User-defined condition handlers, which are established via a callable service are discussed later but are executed prior to the HLL condition handler. However, they still follow the stack frame-based model.) A pointer, the handle cursor, identifies the stack frame which has a condition handler currently in control or is about to gain control.

Each condition handler may respond to the condition with one of the following responses:

handled (resume)

percolate
promote

The semantics of the model defined is that of a one pass stack frame based condition handler. This implies that each stack frame created by the application will be visited once and only once for a given condition. Each stack frame is given one opportunity to react to a condition. It may handle the condition, percolate the condition, or promote the condition.

An exception to the one pass model is any stack frame owned by PL/I. The Condition Manager will re-drive all stack frames containing PL/I code if the condition reaches the PL/I condition handler at stack frame zero.

Any condition that is unhandled by the application (i.e., percolated to stack frame zero) will be subject to the defined default actions.

Figure 5:
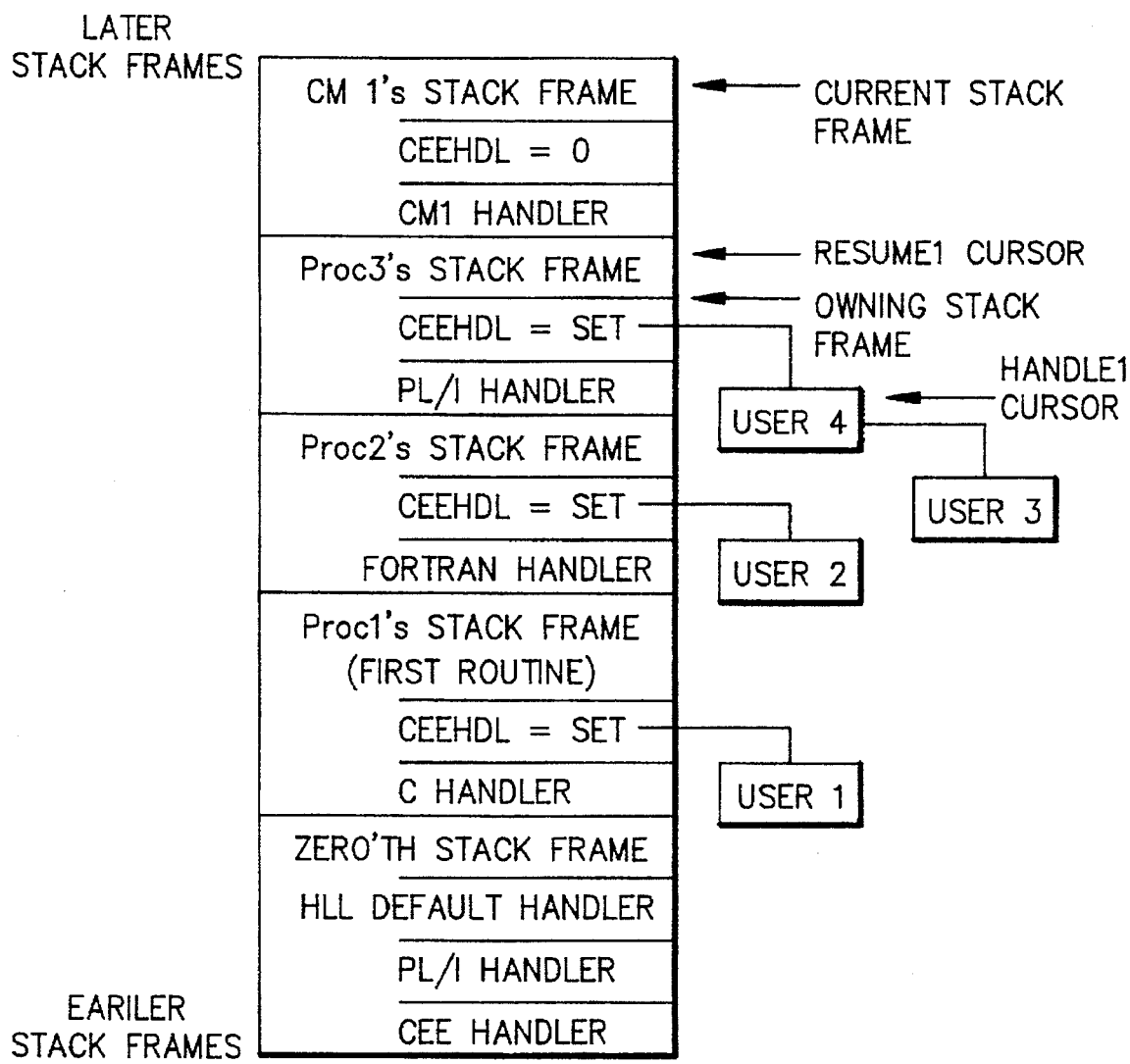
FIG. 5 shows first example's sample initial stack and cursors.

A detailed general example will be discussed using FIG. 5. For this example let us make the following assumptions:

1. Proc1 is the 'main' procedure, which calls Proc2, and which in turn calls Proc3.
2. The resume cursor will not be moved.
3. The current stack frame is the stack frame associated with the procedure currently operating.
4. The 'owning' stack frame is the stack frame where the condition occurred.
5. Handle1 and Resume1 apply to the first condition and Handle2 and Resume2 belong to the second condition.
6. There will be a Condition Manager stack frame on the stack for every active condition.
7. All user condition handlers are written in the same language as the routine that installs them. This is not a requirement, but is done for this example for convenience.
8. The starting stack appears as follows. Where user1, user2, user3, user4 are user-installed condition handlers, CM1 is the Condition Manager's High Level Language condition handler; and C Handler, FORTRAN Handler, and PL/I Handler are the respective High Level Language condition handlers.
9. The condition either occurred in Proc3 or was signalled by Proc3. All responses by the Condition Manager are the same for either.

The condition caused the Condition Manager's stack frame to be placed on the stack. The resume1 cursor "points" at the point at which the condition occurred. The handle1 cursor "points" at the last installed user condition handler. In this case it is user4. The following is the sequence of steps in processing the condition.

In the example, the PL/I condition handler is called for enablement. Let us assume that it does not recognize the condition. Therefore, it says that the condition is valid.

At this point if a debugger is running (or at least is initialized), it will be given control. Let us assume that the debugger, if present, percolates the condition.

We start down the queue of user condition handlers associated with the stack frame for Proc3. User4 is the most recently installed user condition handler for routine Proc3. Therefore, it is called first to handle the condition. Let us assume that it does not. We move the handle1 cursor to the next user condition handler. The next user condition handler in the queue is user3.

Let us assume that user3 promotes the condition to something else and lets the processing continue with the next condition handler. We move the handle1 cursor to the next condition handler.

Since user3 is the last user condition handler in the queue, the High Level Language condition handler is called which in this case is the PL/I condition handler. Let us assume that the condition is a user condition and therefore is not recognized by the High Level Language condition handler.

We have now called all condition handlers associated with Proc3's stack frame, so we move the handle1 cursor to Proc2's first user condition handler which is user2. User2 is now called.

Figure 6:
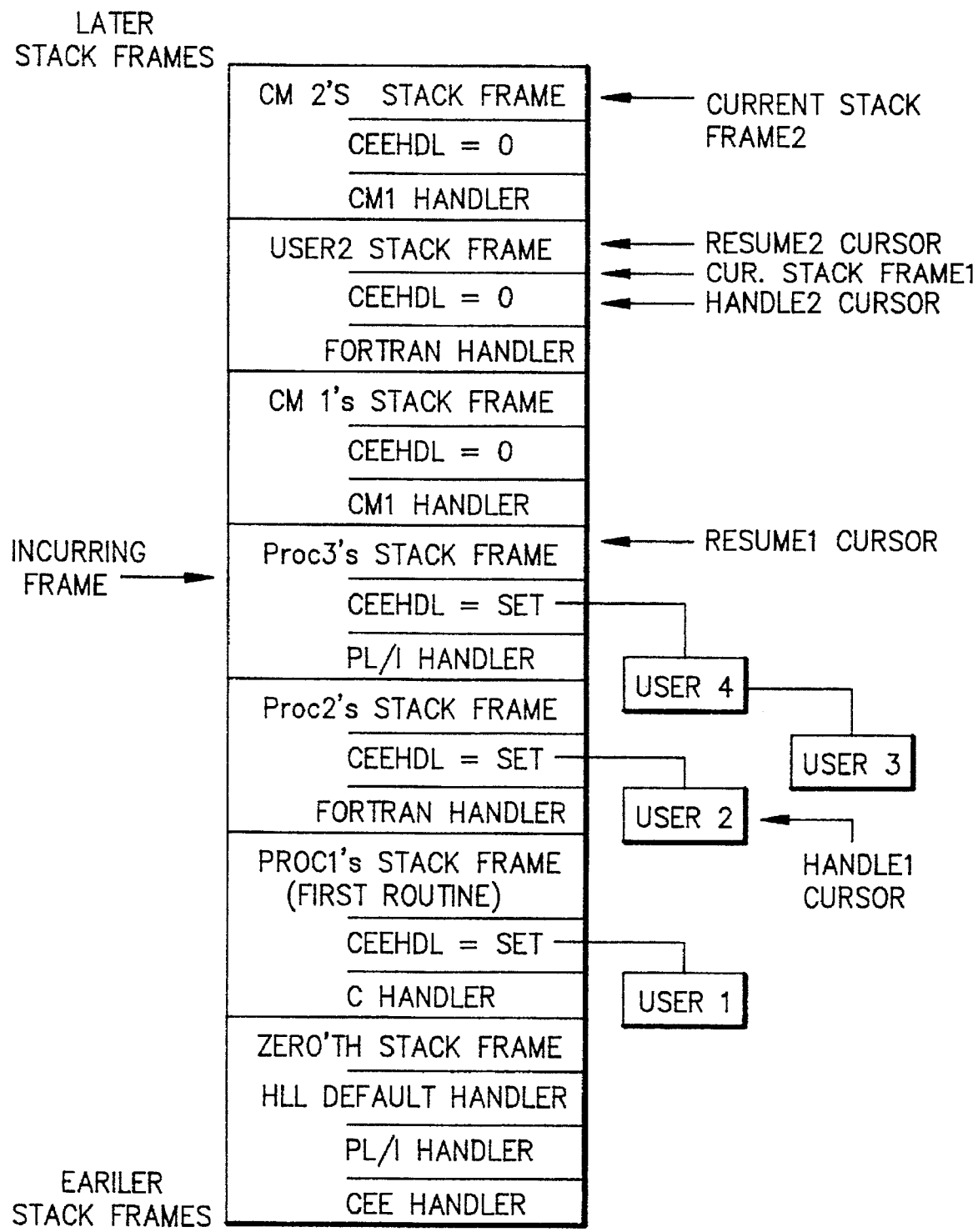
FIG. 6 shows first example's stack and cursors after signaling condition.

User2 signals a new condition. The stack and cursors now look like FIG. 6.

Notice that there is a resume2 cursor and a handle2 cursor placed as indicated. The Condition Manager (number 2) will now start to run and will only work with resume2 and handle2 cursors. Please also note that if resume2 ever gets closer to stack frame zero than resume1, the first condition is "lost." For this example (which is the normal case), we will not move the resume cursors.

Condition Manager2 calls the High Level Language condition handler for user2 for enablement. Since this is a user signal, the Fortran High Level Language condition handler does not recognize the condition and enables it.

Condition Manager2 checks user2 for any user condition handlers and finds none. It then calls the High Level Language condition handler for user2 who does not handle the condition. The handle2 cursor is now moved to the next stack frame which is Condition Manager1's stack frame. There is no user handler for Condition Manager 1. The handle2 cursor is moved to Condition Manager1's High Level Language condition handler (CM1) which does not handle the condition. Please note that since Condition Manager1's stack frame is on the stack in an earlier stack frame than resume2 cursor, it must be processed.

We now move handle2 cursor to the first user condition handler for Proc3 which is user4. We could continue not handling the condition all the way down the stack to stack frame zero, but for this example, we are assuming that user4 handles the second condition.

Since user4 handled the condition, control is returned to the routine that 'signalled' the condition, user2. The stack looks like FIG. 6 except Condition Manager2, resume2 cursor, and handle2 cursor are gone. Let us assume that user2 now promotes the condition to yet another condition and returns.

Handle1 is now moved to the next condition handler which is Proc2's High Level Language condition handler (for FORTRAN). The FORTRAN condition handler percolates the condition and handle1 cursor is moved to the next condition handler which is Proc1's user condition handler (user1). User1 does not recognize the condition and percolates it.

Handle1 cursor is moved to Proc1's High Level Language condition handler (C in the example). The High Level Language condition handler does not recognize the condition and percolates it.

Since Proc1 is the first stack frame prior to stack frame zero, any further action taken on this condition will be default actions.

Figure 7:
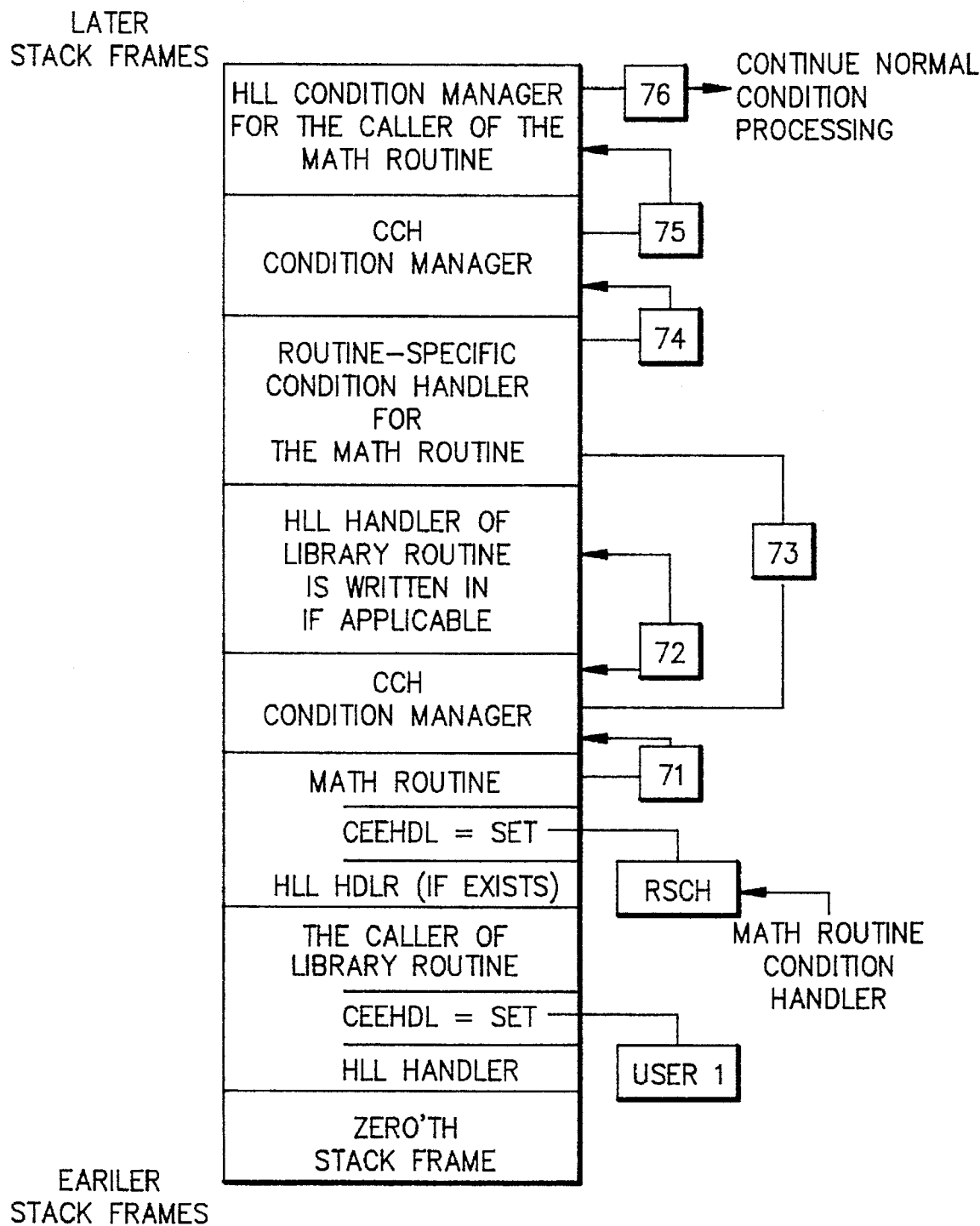
FIG. 7 shows second example's initial stack and cursors.

Next an example of use of the invention with Run-time Library routines will be illustrated using FIG. 7. Math routines which compute trigonometric functions are one example of Run-time Library routines. Condition-handling for the run-time libraries must reflect the semantics of the language environment of the caller. Programming languages vary widely in condition handling semantic action in regard to library routines. A condition could be discovered internally by the library routine (e.g., parameter checking leads to domain error) or the Condition Manager could be the first to become aware of a condition (hardware zero divide exception). The steps are as follows:

1. The library routine detects a condition and signals the Condition Manager without a feedback code (FC) 71.
2. The Condition Manager calls the HLL handler of the language that the library routine is written in for enablement (if applicable) 72.
3. The Condition Manager calls the Routine-Specific Condition Handler (RSCH) for the library routine (if one exists) 73.
4. The RSCH re-signals the condition but this time with a FC 74. (This allows all fix-up logic to reside in the RSCH.)
5. The Condition Manager then calls the HLL condition handler for the language of the caller of the library routine for enablement 75.
6. Condition processing then proceeds as normal 76.

When the library routine runs on its own stack frame

If the condition is detected by hardware, the following actions occur:

1. The Condition Manager is passed control and subsequently calls the routine-specific condition handler to further define and/or qualify the condition.
2. The routine-specific condition handler then transforms the hardware defined condition into the equivalent software condition. (This may be specific to the defined interface to the individual library routine.)
3. The following steps are then taken by the routine-specific condition handler:
   A instance specific information block containing the appropriate information is built, if required.
   All necessary data needed to fully qualify the condition is assembled into a qualifying data block.
   The transformed condition is signaled with a feedback area provided.

If the condition was discovered by the library routine itself (i.e., software detected), the following actions occur:

1. If the library routine was called with a feedback code, the appropriate condition token is placed into the feedback area and returned to the caller of the library routine.
2. If no feedback area was provided on the call to the library routine, the condition is signaled to the Condition Manager without providing a feedback area.
3. The Condition Manager then calls the routine-specific condition handler which takes the same actions as in the case of a hardware-detected condition.

The condition-specific qualifying data takes the form of a vector of addresses pointing to any additional data required to understand the condition and/or perform fix-up actions. Routine-specific condition handlers are registered at runtime.

In either case, processing of the condition then proceeds as described below. For all conditions not returned as a feedback token, the following actions occur:

1. The language-specific condition handler for the language in which the library routine is written is called for enablement, if one exists.
2. The Condition Manager then calls the routine-specific condition handler, to handle the condition. Each library routine may register a routine-specific condition handler with the Condition Manager. This routine-specific condition handler is similar, in effect, to a user condition handler. Although the routine-specific condition handler is a "full function" condition handler, its intended actions are to resume, percolate enablement, or percolate enablement and transform the condition. When percolating enablement (with or without transformation), the routine-specific condition handler is required to provide the message insert data and the condition-specific qualifying data necessary to permit the continued handling of the condition.
3. If the response of the routine-specific condition handler is to percolate enablement, the Condition Manager first resets any previous enablement of the condition and then calls the language-specific condition handler of the language of the caller of the library routine for enablement. Normal condition processing then continues in the calling stack frame.

During the processing of a condition originating in a library routine, a valid action is to fix-up and resume. For this purpose, two conditions that can be returned to the routine-specific condition handler of the library routine are provided. They are: fix-up with new input value and resume with new output value. When either of the defined fix-up actions are requested, the identifying feedback token is returned to the library routine-specific condition handler. This handler, working in cooperating with the library routine and its caller, can then provide the logical actions necessary to properly do the indicated fix-up activity.

When the library routine runs on its callers stack frame

Figure 8:
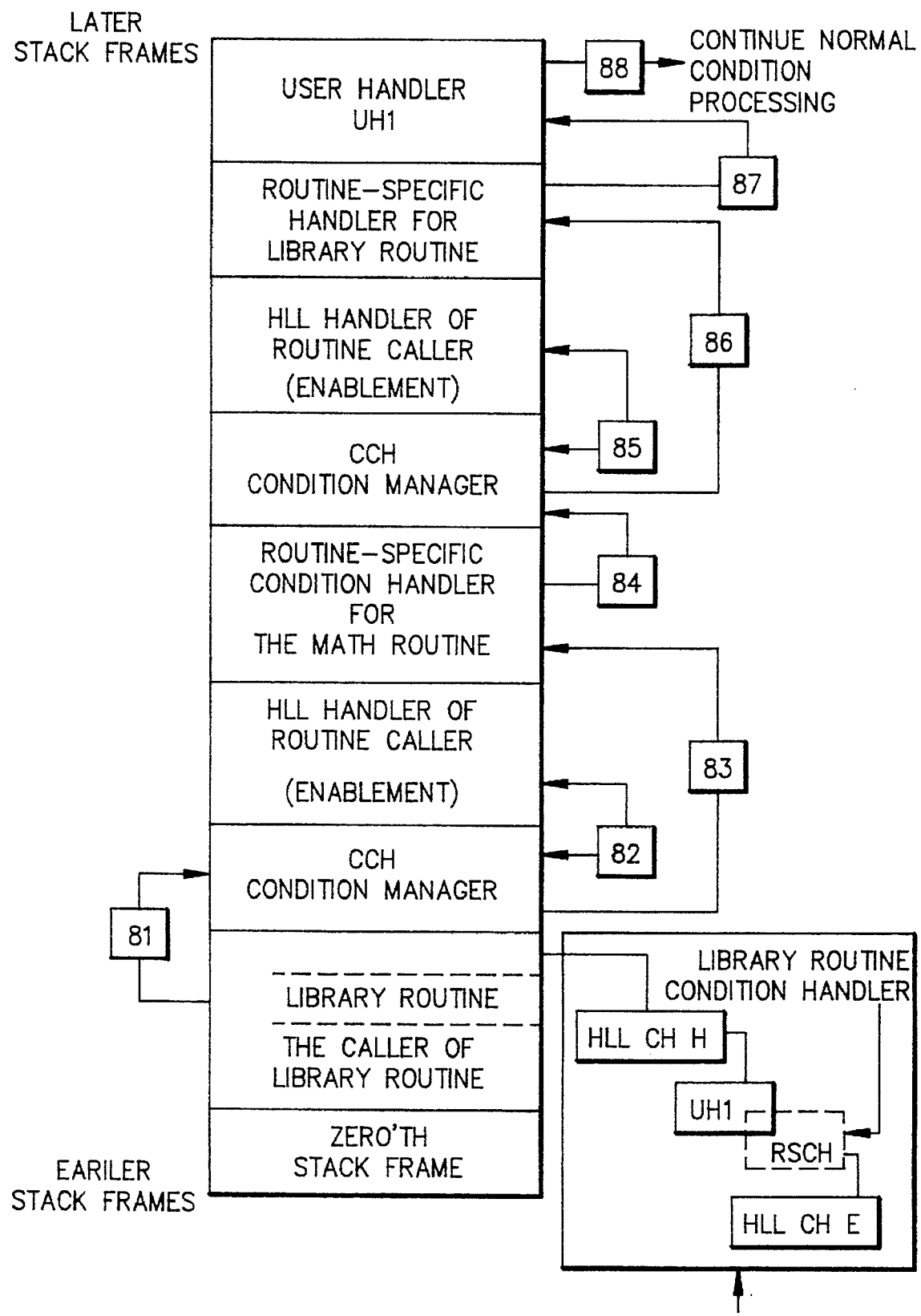
FIG. 8 shows stack view of library routine condition handling using caller's stack frame.

When library code is placed "in-line" with the generated code of its caller, as the result of an overt action of the compiler, the compiler must also place in the module prologue the following information for each instance of a library routine contained within the generated code:

offset of the start of the library routine length of the library routine a handle identifying the routine specific condition handler associated with the library routine Condition handling follows the same general process as when the library routine runs on its own stack frame, but with differences as described in FIG. 8. The processing steps as follows:

1. The library routine detects a condition and signals the Condition Manager without a feedback code 81.
2. The Condition Manager calls the HLL handler of the language that owns the stack frame containing the library routine for enablement 82.
3. The Condition Manager calls the Routine-Specific Condition Handler for the library routine (if one exists) via a search of the module prologue to determine if the location of interrupt indicates that execution was within the library routine at the time of the condition 83. (Note: This indicates a pseudo-static registration of the routine-specific condition handler for the execution time within the library routine.)
4. The RSCH re-signals the condition but this time with a feedback code 84. (This allows all fix-up logic to reside in the RSCH.)
5. The Condition Manager then calls the HLL condition handler of the owning frame for enablement of the new condition 85.
6. The HLL condition handler indicates that the condition is enabled and the Condition Manager calls the first "user" handler, the library routine-specific condition handler 86.

7. The RSCH then percolates the condition causing the user condition handler, UH1, to be called 87.

8. Condition processing then proceeds as normal 88.

Order of processing at stack frame zero

The normal condition handling sequence traverses the stack from later frames toward earlier frames. If a condition has not been handled by the time that the stack has been traversed to stack frame zero, the Condition Manager will take control of the expected actions. For compatibility with current language default condition handling, a virtual queue of language specific condition handlers is maintained for stack frame zero.

There is logically one stack frame zero for each thread. It is the first application routine on the thread. Due to the fact that the thread may have non-CCH stack frames on it's stack without a way for CCH to go around them, CCH will assume a "Virtual" stack frame zero whenever one of these non-CCH stack frames are encountered. At this point stack frame zero processing will commence with the last CCH stack frame processed. There will be up to three High-Level Language condition handlers in this virtual queue. The first handler called is the non-multi-pass High-Level Language condition handlers who may wish to have default processing at stack frame zero. The following occurs:

During normal condition processing when the language specific condition handler is called for enablement, it places its facility id in the Cond_Default field of the CEECIB.

When the handle cursor reaches stack frame zero, the Condition Manager will call the High-Level Language condition handler for the facility id in the CEECIB field Cond_Default. This condition handler may then apply the language defined default condition handling semantics. This will include all normal handler actions.

This routine must return to the Condition Manager in order to get unregistered.

The Second is the oldest PL/I or multi-pass High-Level Language on the stack. The following actions occur:

The condition handler will be installed by CCH.

If a condition reaches this installed condition handler for stack frame zero, the condition handler will be called for stack frame zero processing. If the condition handler determines that the stack will be re-walked only multi-pass stack frames will be revisited and then only the High-Level Language condition handlers will be called.

The condition handler installed for thread 1 will be used for all threads in the application.

The last handler in this queue is the Condition Manager which will implement the defined defaults for all unhandled conditions.

Termination due to an unhandled condition

The Condition Manager default action of terminating a thread if a condition of severity 2, 3, or 4 is unhandled, is accomplished by calling the CEEEXTD service. If the enclave is terminated as a result of the termination of a thread due to an unhandled condition, a value of 0 will be used as the user return code portion of the return code (i.e., any user return code is ignored).

Handle Cursor Movement

The handler cursor is not explicitly manipulated by either High-Level Language or user condition handlers. Its movement is actually controlled by the Condition Manager, but Condition Manager uses the result code that is returned by the condition handler to determine the action. This movement is toward the zeroth stack frame, except when the condition is promoted. In this instance, the handler cursor can point to the stack frame where the resume cursor points or to the current or first handler for the stack frame for which condition handling is currently occurring. Handling of promoted conditions may also continue at an earlier frame, of course, as for percolated conditions.

Resume Cursor Movement

The resume cursor is manipulated by the callable services CEEMRCR and CEEMRCE. When the resume cursor is moved to a particular stack frame, it has the effect of involuntarily terminating all frames from the previous resumption point up to but not including the new resumption point. As noted above, this may have the effect of truncating any condition handling that was active for any of these terminated frames.

Since the resume cursor indicates a point of resumption, it does not simply point to an invocation (stack frame), but also logically points to the instruction within the associated procedure where execution would resume. In addition, it is logically associated with a set of machine state (e.g., register) information which would be required to establish a proper execution environment if execution is to resume.

Conventions of use

This section describes the conventions of use that the High-Level Language library and the application programmer should follow. Following these guidelines promotes the cooperative interaction required to produce a consistent view of the condition handling model. Each group, High-Level Language libraries and application programmers, is discussed separately below.

High-Level Language Regulations, Requirements, and Information

In order to work in concert with each other, the HLL condition handlers must adhere to a set of regulations. Also, some extensions to the current High-Level Language error handling schemes are required so that the condition handling model is complete. By doing so, a consistent, cooperative view of the condition handling model is produced. This section lists these regulations and requirements on the HLL's, as well as some additional information provided to aid the HLL writer.

The HLL condition handling models basically fall into two categories: the stack frame based model (e.g., PL/I), and the Global Error Table (G.E.T.) model (e.g., IBM FORTRAN). To ensure a consistent view of condition handling in a multi-language thread which may involve both models, cooperation is required among the HLL condition handlers.

The regulations for the HLL condition handling are:

All HLL condition handlers must percolate all unknown conditions. An unknown condition is one for which the HLL has no defined action.

When an HLL condition handler is invoked for enablement, unknown conditions must be enabled.

All (enabled) conditions of severity 0 or 1 must permit a resume at the next sequential instruction without requiring any fix-up.

When the action for a given condition is "ignore," the condition is considered to be disabled and the HLL condition handler must return not enabled when it is invoked for enablement. For example, C allows a condition to be ignored by specifying SIG_IGN on the call to signal.

Some hardware conditions can be detected via software prior to actually raising the hardware condition. For example, the software can check for the ZeroDivide condition by checking for a zero divisor. If a condition is defined to be enabled by the HLL, and software detects a potential hardware condition, then the equivalent CCH condition must be signalled using CEESGL.

Despite the above, statement-oriented language constructs are most appropriately handled directly in the HLL. Any corresponding condition is defined to be disabled. For example, the ON SIZE clause of a COBOL DIVIDE verb (which includes the logical equivalent of the actually raising a condition.

For HLL's that employ the G.E.T. model, some regulations must be followed so that in a multi-language application that contains both the G.E.T. model HLL and a stack frame based model HLL, the two models can work in concert. These regulations are:

For enabled conditions, the actions defined in the G.E.T. are divided into two groups:
1. fix-up and resume
2. other than fix-up and resume If the default action is "fix-up and resume," then that action must be taken at the owning stack frame.

If a user explicitly alters the action that needs to be taken for a particular condition within the G.E.T., for example, registering his own handler to field the condition instead of taking the default action, then the user-specified action must be honored.

If the condition is presented to a stack frame other than the owning stack frame (implying that the condition occurred in a non-G.E.T. language) or if the default action is something other than "fix-up and resume," then the HLL condition handler must percolate the condition. Specifically, any existing G.E.T. actions that specify termination must be changed to percolation. These rules allow current semantics to be followed, but also permit inter-language cooperation.

If the HLL condition handler for the G.E.T. model is invoked for the zeroth stack frame, the "true" system action must be enforced at this time.

All HLL condition handling routines must be capable of being recursively entered, thus allowing for a condition to occur while handling a condition.

Those HLL's that employ a G.E.T. must provide a mechanism to allow a condition to be percolated. Users must be able to specify the percolation action. For example, C could define __SIG__PERC to mean percolate the condition. FORTRAN could define a percolate action for its Error Option Table.

Each HLL should provide a condition handler that can logically be installed at the zeroth stack frame. This allows the HLL of the first routine to dictate the language-defined default system action when a condition is not handled by any stack frame within the application. This implies that, for example, given a PL/I first routine, PL/I can implement its system action for every PL/I condition. It further implies that those HLL's that have a global model can enforce the global language action for conditions at the zeroth stack frame.

The following list provide some information and suggestions intended to be helpful to implementers of HLL's:

Some conditions are considered to be HLL-specific. For example, I/O related conditions are usually HLL-specific. Other HLL-specific conditions include the AREA, CONDITION and SIZE conditions in PL/I and range errors in Pascal.

Conditions are either HLL-specific, or "generic" across the HLL's and platforms.

The enablement phase is performed for all conditions regardless of the origin—hardware or software (CEESGL, for instance).

The enablement phase allows the HLL to enforce constructs such as PL/I's prefix conditions and COBOL's ON SIZE clause. (COBOL can simply generate in-line code to check for this and honor the ON SIZE without ever signalling a condition.)

The HLL's should use the severity that is contained within the condition representation to advantage. For example, PL/I could signal the PL/I ENDPAGE condition at severity 1. If no handler acted on the condition, Condition Manager would take the default action for unhandled severity 1 conditions, which is to resume at the next sequential instruction following the signal.

PL/I support the ANYCONDITION condition. Without this, PL/I will not be able to enforce its system action in an application whose first procedure is not PL/I. This is because the condition handling model performs a single pass over the stack frames, presenting the condition in its original form. If the condition is not the PL/I ERROR condition, then PL/I ERROR on-units will not be driven. (In a PL/I application, the PL/I ERROR condition would be raised when the system action was applied to a condition.) The implementation of the ANYCONDITION would allow a PL/I subroutine to field all conditions during the single pass.

User Condition Handler Conventions

The user-written handlers must adhere to a set of conventions and restrictions:

The HLL user-written handlers must be capable of being recursively entered.

The user-written condition handler will be passed any condition that is encountered. Thus, they should percolate all unknown conditions.

As indicated above conditions may be signaled by a program when there is no hardware or operating system detected problem. CCH provides the callable CEESGL service to create signals. Regardless of whether the source of the condition is the hardware, the operating system, or a software signal, the condition is first communicated to the Condition Manager. The Condition Manager may then pass control to the subordinate condition handlers, which continue condition handling processing.

Subordinate condition handling routines may be invoked by the Condition Manager to handle conditions. Subordinate condition handlers are divided into three categories, including low-level error handlers, enablement routines, and condition handlers. These routines are called during different phases of CCH condition handling and are described below.

Low-level Error Handlers

If invoked, these routines handle the condition. The Condition Manager may resume execution at the next sequential instruction (after the point of interruption) in the program that caused the condition, or they may resume execution at a specified location. These routines are called by the low-level error handler.

Emulate (program checks only)

System architectures often limit the availability of some instructions on particular machines. CCH implementations for those machines may choose to provide emulation for these restricted instructions. In those cases, the emulation point is automatic, and execution is resumed with the next sequential instruction (after the point of interrupt) in the program that caused the interrupt. For example, the Condition Manager emulates the extended floating point divide instruction on S/370.

Shunt (program checks)

The shunt routine is intended for language library routines and debuggers. A shunt routine is typically used when a high performance segment of code needs to protect itself from a likely exception. The routine is normally established for short periods of time while the library routines or debuggers are providing services to the application. If a shunt routine exists, the Condition Manager performs no further processing after it invokes the shunt routine.

Enablement Routines determine if an condition (a hardware detected error, an operating system detected error, or a software signalled error) should be processed as a condition. In addition, these routines may provide low-level processing of an condition. Enablement routines are called during the enablement phase.

Language Specific Enablement Handler

Language specific enablement handlers are associated with a particular language used in an application. One language specific enablement handler is logically associated with each stack frame. (A stack frame is a DSA or a register save area that is on the activation chain.) A null language-specific enablement handler is also possible. The language specific enablement handler associated with the stack frame determines whether an condition (an interrupt or an exception) is to be treated as a CCH condition. This determination occurs during the Condition Manager enablement phase. In other words, these routines determine if a hardware condition or a software condition requires any further action. If the condition requires no further action, the Condition Manager resumes execution; i.e., execution begins at the instruction following the point at which the interrupt occurred. If the condition requires further action, it is processed by the Condition Manager (as a condition) during the condition phase.

Condition Handlers

The condition handlers examine the cause of the condition and perform any action required on the condition. The Condition Manager invokes the condition handlers during the condition phase.

Debugger

The debugger interface is a special interface to an application debugging product. The debugger may handle the condition or indicate that condition handling should continue. During condition management, the debugger is potentially invoked after a condition is determined to be enabled, and for promoted condition.

User Condition Handler

A user condition handler is established (registered) with the callable CEEHDLR service. The CEEHDLR service dynamically requests the Condition Manager to pass control to a user-supplied condition handling routine when a condition occurs. The user condition handler is associated with the stack frame in which it was established. A queue of user condition handlers may be associated with each stack frame. During the condition phase, the Condition Manager invokes the user condition handlers (in LIFO order) at each stack frame to handle the condition. The established user condition handlers are invoked before the language specific exception handler associated with each stack frame. A user condition handler is explicitly diestablished (unregistered) using the CEEHDLU service, or implicitly when the routine that registered the user condition handler returns to its caller. Each user condition handler can return to the Condition Manager with any of the allowable responses.

Language Specific Exception Handler

In general, languages use the language specific exception handler to implement their condition handling semantics. A language specific exception handler may be associated with each stack frame. Language specific exception handlers are invoked during the condition phase. During the condition phase, the Condition Manager invokes the language specific exception handlers to handle the condition. The Condition Manager invokes the language specific exception handlers starting with the language specific exception handler associated with the stack frame pointed to by the handle cursor and proceeding from stack frame to stack frame until reaching stack frame zero. Each language specific exception handler can respond in any of the defined ways.

Exit Routine

Languages may specify actions that are to be taken when an invocation is abnormally exited, i.e., not using the return process. This is done by associating an exit routine with the stack frame. If a stack frame prematurely terminates, for example during condition handling, or the resume cursor is moved past the associated stack frame, language-specific exit handler invocation does not occur immediately, but rather in subsequent processing.

From the list above, the following features of Condition Manager condition handling schemes are observed.

Users implement their condition handling using the user condition handlers.

Languages implement their condition handling using the following.

Shunt routine

Language specific enablement handler

Language specific exception handler

Enablement routines have been broken out as a separate category of the subordinate condition handlers. This ensures the cross-system consistency of condition handling.

The category of user condition handlers has been added to the subordinate condition handlers. This allows all language users access to condition handling, and it allows users of languages with existing condition models to access the full power and function of the CCH Condition Model.

The category of exit routines has been added, and exit handling is a separate and distinct activity. In combination with the concept of a resume cursor. This separation of exit handling from the rest of condition handling distinguishes the CCH condition handling model from earlier models and gives it the strength to satisfy existing language requirements while simultaneously allowing implementation of a more powerful and robust condition handling mechanism.

Responses to conditions

The subordinate condition handlers respond to a condition with Resume, Percolate or Promote. The subordinate condition handlers must return to the Condition Manager which actually performs the requested action. The Resume cursor can be modified by first using the CEEMRCR callable service. Percolation of a condition occurs when a subordinate condition handler declines to handle the condition and gives the calling invocation an opportunity to handle it. This process may be repeated through multiple invocations within a thread before the condition is finally handled by some subordinate condition handler. A condition is promoted when a subordinate condition handler converts the condition into a new condition with a different meaning. A subordinate condition handler may promote a condition for a variety of reasons, including the subordinate condition handler's knowledge of the cause of the original condition or the subordinate condition handler's lack of knowledge of the cause. An example of the latter case is PL/I's promotion of an unhandled condition at stack frame zero to ERROR and resetting the handle cursor to the resume cursor. A condition may also be promoted to simulate conditions that would normally come from a different source.

After a condition is promoted, the Condition Manager continues processing by invoking subordinate condition handlers to handle the promoted condition. The order of invocation is described below. In addition, the Condition Manager retains information about the original condition.

Overview of Condition Manager phases

When a condition occurs, the Condition Manager enters separate phases to handle the condition. A phase is a sequence of subordinate condition handler invocations. Specific types of routines are invoked during each phase. Some types of routines may not be invoked during a particular phase.

The phases of condition handling are discussed below.

Low-level error handling phase (Program checks and ABENDs)

During the low-level error handling phase, if a shunt routine had been established, the condition manager would resume execution at the address indicated. Once the resumption has occurred, condition handling for this condition is complete and the remaining phases do not occur.

Enablement phase

During the enablement phase, the Condition Manager invokes a language specific enablement handler to determine if a condition is to be acted upon or requires no further action. A language specific enablement handler is responsible for enforcing language-specific semantics. During this phase, conflicts between the hardware and the language are resolved.

The Condition Manager invokes the language specific enablement handler associated with the most recently activated DSA or stack frame for which a member is identifiable. The enablement phase ends when the invoked language specific enablement handler returns. Other phases of condition handling are omitted of the condition is not enabled.

Debugger phase

When a condition is determined to be enabled, under control of a run-time option, the debugger is notified of the condition.

Condition phase

During the condition phase, user condition handlers and language specific exception handlers are invoked to examine the cause of the condition and to perform any action required on the condition. More specifically, the Condition Manager traverses the stack (stack frame by stack frame), starting at the stack frame pointed to by the handle cursor and ending at stack frame zero or when a user condition handler or language specific exception handler handles the condition. At each stack frame, the Condition Manager invokes the user condition handlers (in LIFO order) followed by the language specific exception handler associated with that stack frame. The user condition handlers and language specific exception handlers can respond to the condition in any of the ways described as "Responses to conditions".

The Condition Manager phases have the following characteristics.

The Condition Manager may enter into the phases in response to an interrupt (hardware error), exception (software error), or signalled condition.

For interrupts (hardware errors) and exceptions (software errors), the Condition Manager enters the low-level error handling phase before the enablement phase.

For interrupts (hardware errors), exceptions (software errors), and conditions, the Condition manager enters the enablement phase before it enters the condition phase.

If the condition is handled by a low-level error handlers during the low-level error handling phase, then the Condition Manager enters no subsequent phases.

If the language specific enablement handler determines that an condition should not be treated as a condition during the condition phase, then the Condition Manager does not enter the condition phase.

When condition occur or conditions are signalled during condition handling, the handling of the current condition is suspended and further action is taken based on the "state" of the condition handling that is being maintained in the CEECIB. If a nested condition is allowed, the Condition Manager begins handling the latest condition. When condition handling ends for the latest condition, execution begins at the instruction pointed to by the resume cursor. The resume cursor can be moved from its initial setting.

Although it is possible to implement the invention without forcing language syntax changes in any of the common languages, in the preferred embodiment a new construct was added to the COBOL compiler's capability for convenience. The change was to allow the declaration of a "PROCEDURE-POINTER" as follows:

pgmptr usage is PROCEDURE-POINTER.

When used to register a user condition handler, the previously declared variable "pgmptr" would be used as follows:

---

Set pgmptr to entry "SIMHDLR".
...
Call "CEEHDLR" using pgmptr token fbcode.

---

Table 1 is a sample COBOL test program (EXCOND) which registers, tests and unregisters a user condition handler. Table 2 is a sample user condition handler (SIMHDLR) written in COBOL. For the variable Current-condition the first 8 bytes are declared as of the condition tokens for IBM's System/370 program interrupt codes 0C1 thru 0CF. Table 3 is a sample COBOL routine (DIVZERO) to cause a condition. The program EXCOND installs SIMHDLR and tests it be calling DIVZERO.

TABLE 1

```
CBL C,RENT,Q,LIST,NODYNAM,TEST(SYM)
 ** ID DIVISION                                    ***
    Identification Division.
    Program-id.      EXCOND.
    Author.          LEE.
    Installation.    IBM - Santa Teresa Laboratory.
 ** ENVIRONMENT DIVISION                           ***
    Environment Division.
    Configuration Section.
    Input-Output Section.
    File-control.
 ** DATA DIVISION                                  ***
    Data Division.
    File Section.
    Working-storage Section.
    01  fbcode.
    02  fb-severity    pic 9(4) Binary.
    02  fb-detail      pic x(10).
```

TABLE 1-continued

```
  77  divisor        pic S9(9) Comp.
**
** Declares for condition handling
**
  77  token          pic X(4).
  77  pgmptr         usage is PROCEDURE-POINTER.
  01  CEE000         PIC X(12).
      88 fb-ok value x"000000000000000000000000".
  Linkage Section.
** PROC DIVISION                                              ***
  Procedure Division.
  PARA-CND01A.
**
** Register a user condition handler.
**
      Set pgmptr to entry "SIMHDLR".
      Move ZERO to token.
      Call "CEEHDLR" using pgmptr token fbcode.
      Display "EXCOND: Registered SIMHDLR."
      Upon console.
**
** Call DIVZERO to force a zero divide and
      drive SIMHDLR
**
      Move 00 to divisor.
      Call "DIVZERO" using divisor.
      Display "EXCOND: Resumption after DIVZERO."
      Upon console.
** Unregister the user condition handler.
      Call "CEEHDLU" using pgmptr fbcode.
      Display "EXCOND: Unregistered SIMHDLR."
      Upon console.
      Goback.
  End program EXCOND.
```

TABLE 2

```
Identification division.
Program-id. SIMHDLR.
Environment division.
Data division.
Working-storage section.
1 Misc-Variables.
    02 move-type-0         pic s9(9) binary value zero.
01 Feedback.
    02 Fb-severity         pic 9(4) binary.
    02 Fb-detail           pic x(10).
Linkage section.
1 Current-condition.
    2 filler               pic x(8).
       88 CEE341 value x"00030C8159C3C5C5".
       88 CEE342 value x"00030C8259C3C5C5".
       88 CEE343 value x"00030C8359C3C5C5".
       88 CEE344 value x"00030C8459C3C5C5".
       88 CEE345 value x"00030C8559C3C5C5".
       88 CEE346 value x"00030C8659C3C5C5".
       88 CEE347 value x"00030C8759C3C5C5".
       88 CEE348 value x"06030C8859C3C5C5".
       88 CEE349 value x"00030C8959C3C5C5".
       88 CEE34A value x"00030C8A59C3C5C5".
       88 CEE34B value x"00030C8B59C3C5C5".
       88 CEE34C value x"00030C8C59C3C5C5".
       88 CEE34D value x"00030C8D59C3C5C5".
       88 CEE34E value x"00030C8E59C3C5C5".
       88 CEE34F value x"00030C8F59C3C5C5".
    2 filler               pic x(4).
1 Token pic x(4).
1 Result-code pic s9(9) binary.
       88 resume      value +10.
       88 percolate   value +20.
       88 perc-sf     value +21.
       88 promote     value +30.
       88 promote-sf  value +31.
1 New-condition       pic x(12).
Procedure division
    using current-condition token result-code new-condition.
```

TABLE 2-continued

```
    Display ">>> SIMHDLR: Entered User Handler"
    upon console.
    If CEE349 then
       Call "CEEMRCR" using move-type-0 feedback
       Set resume to true
       Display ">>> SIMHDLR: Resuming execution"
       upon console.
    Else
       Set percolate to true
       Display ">>> SIMHDLR: Percolating it"
       upon console
    End-if.
    Goback.
End program SIMHDLR.
```

TABLE 3

```
CBL C,RENT,Q,LIST,NODYNAM,TEST(SYM)
****************************************************
**     ID DIVISION                                 ***
****************************************************
Identification division.
Program-id. DIVZERO.
Environment Division.
****************************************************
**     DATA DIVISION                               ***
****************************************************
Data division.
Working-storage section.
Linkage section.
1   Arg pic S9(9) Comp.
****************************************************
**     PROC DIVISION                               ***
****************************************************
Procedure division using Arg.
    Display "DIVZERO: Starting.".
    Compute Arg = 1/Arg.
    Display "DIVZERO: Returning to its caller.".
    Goback.
End program DIVZERO.
```

Compiler Writer's Interfaces (CWIs)

The interfaces provided by CCH are described in the following using C subroutine definition syntax.

Interface to/from the Language-Specific Handlers

```
void condition_handler (reason, ceecib, results, new_condition);
   INT4    *reason,
   void    *ceecib,
   INT4    *results;
   FEEDBACK *new_condition;
``` where:

reason (input)

The reason the language-specific handler has been called. This value is passed by reference. This is the event code for the member event handlers. The following are the valid values:

1 Handle the condition represented by the CEECIB (not for stack frame zero)

2 Perform enablement for this stack frame

3 Handle this condition in accordance with the language defaults (this is for the stack frame zero)

CEECIB (input)

The CEECIB for which the condition handler is being called. This value is passed by reference. Part of the CEECIB is the condition_token and the machine environment for the procedure in which the condition occurred.

results (output)

This field contains the instructions indicating the actions that the language-specific handler wants the condition manager to take as a result of processing the condition. This field in passed by reference. The following are valid responses:

| | |
|---|---|
| resume | |
| 10 | Resume at the resume cursor (condition has been handled). |
| percolate | |
| 20 | percolate to the next condition handler. |
| 21 | percolate to the first user condition handler for the next stack frame (This may skip a language-specific exception handler for this stack frame as well as the remaining user condition handlers in the queue at this stack frame.) |
| promote | |
| 30 | promote to the next condition handler. |
| 31 | promote to the next stack frame (This may skip a language-specific exception handler for this stack frame is well as any remaining user condition handlers in the queue at this stack frame.) |
| 32 | promote and restart condition handling for the stack frame denoted by the resume cursor location. |
| 33 | promote and re-drive condition handling with the first PL/I stack frame re-driving only stack frames owned by PL/L (This is provided for PL/I exclusive use so that the PL/I language error handling semantics may be honored.) |
| enablement | |
| 40 | ignore the condition. The thread is resumed where interrupted. |
| 41 | enable the condition for condition handling. |
| 42 | enable the condition and transform the condition (via the new_condition parameter). |
| percolate enablement | |
| 50 | percolate the enablement to the calling stack frame. |
| 51 | transform the condition (via the new_condition parameter) and percolate the enablement to the calling stack frame. | new_condition (output)

The new condition token representing the promoted condition. This field is used only for result values of 30, 31, 32, and 33 denoting promote.

Usage Notes

1. It is invalid to promote a condition without returning a new condition token. If the original condition is returned in new_condition, the Condition Manager acts as if a result of 20 had been specified.

2. Prior to a condition being promoted, the Message Insert Block (MIB) must be populated with the new inserts for the promoted condition if necessary.

3. The Language-Specific Handlers are automatically established by stack frame. The Condition Manager determines the language associated with a given stack frame, and then invokes the event handler with the appropriate event code for enablement, condition handling, or condition handling for stack frame zero.

4. The Language-Specific Handlers are automatically dis-established when the stack frame is popped off the stack either via a return, a GOTO out of block, or moving the resume cursor.

5. If a resume is requested, the member that owns the target stack frame will be invoked immediately prior to passing control to the target stack frame.

Interface to members for resume

```
void resume_in_dsa ( event_code, target_dsa );
    INT4    *event_code;
    void    *target_dsa;
``` where:
event_code (input)
The event code, 10, that identifies this call to the event handler that a resumption from a condition handler will occur within the target_dsa.
target_dsa (input)
The DSA that is the target for the resume.

Usage Notes

1. The condition manager will determine the member that owns the stack frame that is the target of the resume. Once determined, condition manager will invoke the particular member's event handler just prior to performing the resume operation into the stack frame.

2. It is the member's responsibility to perform the necessary actions to allow the resume to occur within the target_dsa.

CEEDHDL

CEEDHDL is used to register a condition handler that will be invoked at stack frame zero if the condition remains unhandled. This service is provided for PL/I's use so that PL/I may apply its semantic actions at stack frame zero for unhandled conditions. The registration affects the entire enclave and remains in affect until it is explicitly removed via CEEUDHD.

```
void CEEDHDL (routine, [token], [fc]);
    ENTRY   *routine;
    INT4    *token;
    FEED_BACK *fc;
``` where:
routine (input)
The entry variable for the routine that will be invoked at stack frame zero. This routine is the member event handler.
token (input/optional)
A 32-bit optional piece of information that is passed to the routine when invoked. This is passed to the member event handler as the fifth parameter for the stack frame zero processing event.
fc (output/optional)
An optional condition token passed by reference. A return to the caller will occur only when a condition is detected.
Conditions returned in fc:

| CEE000 | Severity = 0 |
|---|---|
|  | Msg_No = 0000 |
|  | Message = Success |
| CEE080 | Severity = 2 |
|  | Msg_No = 0256 |
|  | Message = The routine is already registered. |
|  | No action taken. |

Usage Notes

1. It is anticipated that during initialization, PL/I will register its member event handler via CEEDHDL to enforce its error handling semantics.
2. It is anticipated that only PL/I will invoke this service.

CEEUDHD

CEEUDHD is used to unregister a condition handler registered by CEEDHDL.

```
void CEEUDHD (routine, [fc]);
    ENTRY   *routine;
    FEED_BACK *fc;
``` were
routine (input)
The entry variable for the routine that is to be unregistered.
fc (output/optional)
An optional condition token passed by reference. A return to the caller will occur only when a condition is detected.
Conditions returned in fc:

| CEE000 | Severity = 0 |
|---|---|
|  | Msg_No = 0000 |
|  | Message = Success |
| CEE07S | Severity = 2 |
|  | Msg No = 0252 |
|  | Message = The routine is not registered as a stack frame zero handler. |

Usage Notes

1. It is anticipated that during initialization, PL/I will register its member event handler via CEEDHDL to enforce its error handling semantics.

Application Writer's Interfaces (AWIs)

The application writer's interfaces are listed below and discussed in more detail in the following sections.

CEEHDLR—Registers a user condition handler
CEEHDLU—Unregisters a user condition handler
CEEMRCR—Moves the resume cursor to a return point in an older stack frame
CEESGL—Raises a condition
User-Written Condition Handlers

CEEHDLR

The callable service, CEEHDLR, has one function—to register a user condition handler for the current stack frame.

A queue will be provided for each stack frame to accommodate these routines. The queue may be empty. The condition manager accesses the queue elements in LIFO order.

Any registered user condition handlers (created through CEEHDLR and not unregistered by CEEHDLU) are unregistered automatically by CCH upon removal of the associated stack frame from the stack. There is no requirement for the user to remember to remove registered user condition handlers.

```
void CEEHDLR (routine, token, [fc]);
    ENTRY   *routine;
    INT4    *token;
    FEED_BACK *fc;
``` where:
routine (input)
An entry variable or constant passed by reference for the routine that is to be 'called' to process the condition. This routine must be an external routine. That is, it must not be a nested routine.
token (input)
32-bits of information passed by reference that you wish to be passed to your user condition handler each time that it is called. This may be a pointer or any other 32-bit item that the user wishes.
fc (output/optional)
An optional condition token passed by reference.
Conditions returned in fc:

| CEE000 | Severity = 0 |
|---|---|
|  | Msg_No = n/a |
|  | Message = The service completed successfully. |
| CEE080 | Severity = 2 |
|  | Msg_No = 0256 |
|  | Message = The routine specified is already registered for this stack frame. |
| CEE081 | Severity = 2 |
|  | Msg_No = 0257 |
|  | Message = routine contains an invalid ENTRY variable. |

Usage Notes

CEEHDLR will not establish a condition handler on a stack frame whose associated routine has a CCH-style PPA and has bit 6 in the PPA1 CEE flags (offset 2 in the PPA1) set to '1'B. This flag indicates that all phases of condition management will skip the associated DSA. This will allow library routines that intervene between the user's code and the CEEHDLR routine to be present. This situation has occurred when a COBOL routine issues a CALL variable (or dynamic call) to CEEHDLR. A COBOL library routine is placed between the user's code and CEE- HDLR to manage the call variable. This particular COBOL library routine should set the PPA flag for "condition management actions" to be '1'B.

CEEHDLU

The callable service, CEEHDLU, has one function—to unregister a user condition handler for the current stack frame.

Any registered user condition handler (created through CEEHDLR and not unregistered by CEEHDLU) is unregistered automatically by CCH upon removal of the associated stack frame from the stack. There is no requirement for the user to remember to remove registered user condition handlers.

```
void CEEHDLU (routine, [fc]);
    ENTRY   *entry_variable,
    FEED_BACK *fc;
``` where:

routine (input)

An entry variable or constant passed by reference for the routine that is to be unregistered as a user condition handler. This routine must have been previously registered via CEEHDLR.

fc (output/optional)

A condition token passed by reference.
Conditions returned in fc:

| CEE000 | Severity = 0 |
| | Msg_No = = n/a |
| | Message = The service completed successfully. |
| CEE07S | Severity = 2 |
| | Msg_No = 0252 |
| | Message = Unable to find the requested user condition handler. |

CEEMRCR

The callable service CEEMRCR moves the resume cursor relative to a current position of the handle cursor. The actions supported are:

1. Move the resume cursor to the call point of the routine on whose behalf the condition handler is executing.
2. Move the resume cursor to the caller of the routine on whose behalf the condition handler is executing.

Initially, the resume cursor is placed after the machine instruction that caused the condition. Whenever the resume cursor is moved, as each stack frame is passed, any associated exit routine will be invoked. This moving will also 'CANCEL' any associated user condition handlers. The direction of movement is always toward older stack frames and never toward newer stack frames. The action will occur only after the condition handler has returned to the condition manager.

Multiple calls to CEEMRCR will yield the NET results of the calls; that is, if two calls move the resume cursor to different places, the most restrictive (i.e., toward stack frame zero) will be used.

```
void CEEMRCR (type_of_move, [fc]):
    INT4    *type_of_move;
    FEED_BACK *fc;
``` where:

type_of_move (input)

indicates the target of the resume cursor movement.

0—move the resume cursor to the call return point of the stack frame of the handle cursor. That is, the stack frame which registered the handler invoking CEEMRCR.

1—move the resume cursor to the call point of the stack frame that proceeds the stack frame of the handle cursor. The handle cursor is moved to the first condition handler of the stack frame pointed to by the new resume cursor position.

fc (output/optional)

A condition token passed by reference.
Conditions returned in fc:

| CEE000 | Severity = 0 |
| | Msg_No = n/a |
| | Message = The service completed successfully. |
| CEE07U | Severity = 2 |
| | Msg_No = 0254 |
| | Message = invalid type_of_move discovered. |
| CEE080 | Severity = 1 |
| | Msg_No = 0256 |
| | Message = handle cursor and resume cursor point to the same stack frame. No action taken for type_of_move = 0. |
| CEE081 | Severity = 1 |
| | Msg_No = 0257 |
| | Message = invalid type of move From the "main" routine. |

Usage Notes

1. When a resume is requested, the member's event handler whose code is the target of the resume pointer will be invoked. This permits the member to establish the environment so that resumption can occur.

CEESGL

This callable service raises, or signals, a condition, provides qualifying data for this instance of the condition, and optionally creates Instance Specific Information for this condition. Each enabled signalled condition (of severity 2 or above) increments the error count by one. If the error count becomes equal or exceeds the error count limit (determined by the ERRCOUNT run-time option) the condition manager will terminate the enclave without signalling Termination_Imminent. Promoted conditions do not increment the error count.

Severity 0 and 1 conditions are considered 'safe' conditions, which are conditions that should be ignored if they are not handled and no feedback token was passed when the condition was raised.

```
void CEESGL (cond_rep, [q_data_token], [fc]);
    FEED_BACK *cond_rep,
    INT4      *q_data_token,
    FEED_BACK *fc;
``` where:

cond_rep (input)

A condition representation that is passed by reference.

q_data_token (input/optional)

A 32-bit data object to be placed in the Instance Specific Information for use in accessing the qualifying data associated with the given instance of the condition.

fc (output/optional)

An optional condition token passed by reference that indicates the success or failure of CEESGL.

Conditions returned in fc:

| CEE000 | Severity = 0 |
| | Msg_No = n/a |

| | |
|---|---|
| CEE069 | Message = The service completed successfully.<br>Severity = 0<br>Msg_No = 0201<br>Message = The signaled condition was not handled |
| CEE0EE | Severity = 3<br>Msg_No = 0462<br>Message = ISI associated with the input condition token was not found. |
| CEE0EB | Severity = 3<br>Msg_No = 0459<br>Message = Insufficient storage available to create a new ISI. |
| CEE0EC | Severity = 3<br>Msg_No = 0460<br>Message = ISI list is full and unable to create a new entry. |
| CEE0CE | Severity = 1<br>Msg_No = 0398<br>Message = Resume with new input. |
| CEE0CF | Severity = 1<br>Msg_No = 0399<br>Message = Resume with new output. |

Usage Notes

1. The caller of the CEESGL service must populate the ISI with any insert data (required for formatting the message associated with the condition being raised) prior to making the call to this service. When receiving a feedback code from a callable service, the MIB is already populated.

2. Enablement is determined for conditions raised with this service.

3. The q_data_token is not interrogated by CCH. It can be any value that can be contained within 4 bytes.

4. If a condition is signalled passing a value of q_data_token on the call to CEESGL and a q_data_token value already exists in the associated ISI, the q_data_token in the ISI will be overwritten.

5. The conditions CEE0CE AND CEE0CF, in conjunction with the data pointed to be q_data_token, are used by the routine that experienced the condition to fix-up and/or resume.

User-Written Condition Handlers

```
void condition_handler (C_CTOK, token, result_code,
   new_condition);
   FEEDBACK    *C_CTOK;
   INT4        *token;
   INT4        *results;
   FEED_BACK   *new_condition;
``` where:

C_CTOK (input)

Defines the current condition being processed.

token (input)

The token that was passed into the condition manager with the call to CEEHDLR that registered this condition handler.

result_code (output)

This field contains the instructions indicating the actions that the user condition handler wants the condition manager to take as a result of processing the condition. This field in passed by reference. The following are valid responses

| | |
|---|---|
| resume | |
| 10 | Resume at the resume cursor (condition has been handled). |
| percolate | |
| 20 | percolate to the next condition handler. |
| 21 | percolate to the first user condition handler for the next stack frame (This may skip a language-specific exception handler for this stack frame as well as the remaining user condition handlers in the queue at this stack frame.) |
| promote | |
| 30 | promote to the next condition handler. |
| 31 | promote to the next stack frame. (This may skip a language-specific exception handler for this stack frame as well as any remaining user condition handlers in the queue at this stack frame.) |
| 32 | promote and restart condition handling at the first condition handler of the stack frame of the handle cursor. |
| fix-up and resume | |
| 60 | fix-up and resume<br>When a result code of 60 is used, the contents of the new_condition field returned to the condition manager from the user condition handler will be returned to the caller of CEESGL as a feedback code. If the caller of CEESGL was made without a feedback code, a condition will be raised for attempting a fix-up on a routine for which a fix-up is not defined.<br>Please see a description of "resume with new input" and "resume with new output value," conditions CEE0CE and CEE0CF respectively, in the description of CEESGL. |

Note

The result_code of 60 is valid only if the resume cursor has not been moved.

new_condition (output)

The new condition token representing the promoted condition. This field is used only for results values of 30, 31, and 32, denoting promote, and of 60 denoting fix-up and resume.

Usage Notes

1. It is invalid to promote a condition without returning a new condition token. If the original condition is returned in new_condition, the Condition Manager will signal the following condition:
   Attempt to promote a condition with new=old condition.
   Symbolic name=CEE086
   Severity=3
   Msgno=0262
2. Prior to a condition being promoted, the ISI must be populated with the new inserts for the promoted condition, if necessary.
3. The user condition handlers are registered by CEEHDLR.
4. The user condition handlers are explicitly unregistered via CEEHDLU.
5. The user condition handlers are automatically unregistered when the stack frame is popped off the stack either via a return, a GOTO out of block, or moving the resume cursor.
6. If a resume is requested, the member that owns the target stack frame will be invoked immediately prior to passing control to the target stack frame.

Miscellaneous Condition Manager Topics

CEE3CNC—Control nested conditions (AWI)

The function of the CEE3CNC service is to allow or prohibit a condition handler to permit nested conditions within a user specified condition handler which was registered via CEEHDLR. When a condition handler is first entered, nested conditions are not tolerated. When a tested condition does occur when it is not permitted, then the application is terminated with an ABEND 4087, reason code 2. However, within a user handler, if another use handler is registered (via a call to CEEHDLR), nested conditions are allowed within the user handler so long as another user handler remains registered or is explicitly disallowed via CEE3CNC.

The format of this service is as follows:

```
void CEE3CNC(allow, [fc])
INT4      *allow;
FEED_BACK *fc;
``` where:
allow (input)

When allow is non-zero, nested conditions will be allowed. When allow is zero, nested conditions will not be tolerated.

fc (output/optional)

The feedback code indicating success or failure of the operation. The following message identifiers and associated severities may be returned by the service in the feedback code fc.

Success
  Symbolic name=CEE000
  Severity=0 (fc=0)
  Msgno=0000
No action condition
  Symbolic name=CEE35S
  Severity=1
  Msgno=3260

Leaving and returning to CCH

While executing under MVS, an exception may occur while executing under a different Request Block (RB) than the RB under which the system error handling trap was established (ESTAE). This can occur when a DF/SORT exit is invoked, or when executing in the I/O subsystem. When a resume is requested out of the system exit by CCH, the behaviour defined by MVS in such cases is to purge the RBs up to the level of RB that issued the ESTAE request.

To accomodate this potential RB mis-match (among other things) a set of AWI services is provided that will indicate to CCH "execution out of CCH" and a "return to CCH." The services are CEE3XIT AND CEE3RTN.

```
void CEE3XIT;
void CEE3RTN;
```

Usage Notes

1. CEE3XIT indicates to CCH that a call to non-CCH code is being made.
2. CEE3RTN indicates that the non-CCH routine is returning to CCH execution.
3. When a condition is raised by the system while executing out of CCH, CCH will logically reset the state of the executing thread to the point where the CEE3XIT was issued.
4. The intended use of these services is to bracket calls to services that may not behave in a consistent fashion. For example, the service could issue a LINK SVC creating another RB level, or the savearea is not chained back to the caller (as in the case of DCB exits).
5. HLLs are expected to invoke this service prior to invoking I/O services and DF/SORT (as an example).
6. There is no stacking of multiple cells to CEE3XIT. The last one issued will be considered current.

CEERTX

The function provided by the CEERTX service is to register a user-defined routine to be executed when the stack frame for which it is registered is abnormally terminated/collapsed.

```
void CEERTX(routine, token, [fc])
CEE_ENTRY  *routine;
INT4       *token;
FEED_BACK  *fc;
``` where:
routine (input)

is an entry variable or constant for the routine that is to be called if this stack frame is abnormally terminated.

token (input)

32-bits of information passed to the user exit each time that it is called. This may be a pointer (on platforms whose pointers are 32-bit quantities) or any other 32-bit item that the user wishes.

fc (output/optional)

is an optional condition token which may return the following conditions:

Success
  Symbolic name=CEE000
  Severity=0 (fc=0)
  Msgno—0000
invalid routine references
  Symbolic name=CEE081

Severity=3
Msgno=0257
The CEERTX service could not find the proper prolog constants at the start of the routine.

Notes

1. Multiple user stack frame termination routine are permitted to be registered for each stack frame.
2. The execution of user stack frame termination exit routines is in LIFO order.

CEEUTX

The function provided by the CEEUTX service, is to un-register a user defined routine that was previously registered to be executed when the stack frame for which it is registered is abnormally terminated. The CEEUTX service operates on the user stack frame termination exits that are registered for the stack frame from which the CEEUTX service is called.

```
void CEEUTX(routine, [fc])
CEE_ENTRY    *routine;
FEED_BACK *fc;
``` where
routine (input)
is an entry variable or constant for the routine that is to be unregistered for this stack frame.
fc (output/optional)
is an optional condition token which may return the following conditions:
Success
Symbolic name=CEE000
Severity=0 (fc=0)
Msgno—0000
Invalid routine reference
Symbolic name=CEE081
Severity=3
Msgno=0257
Additional registrations of the routine remain in the queue
Symbolic name=CEE07T
Severity=1
Msgno=0253
The most recently added registration is removed, but earlier registrations remain in the queue for the stack frame.

Note

User registered termination routines are automatically un-registered when the stack frame for which they are registered is collapsed.

Interface to the user termination routine

The interface to the user stack frame termination routine is as follows:

```
void termination_routine(Term_Token)
INT4    *Term_Token;
``` where:
Term_Token (input)
is a 32-bit token which is used as input to a set of platform specific callable services that provide access to data for use by the user stack frame termination exit.

Notes:

1. User termination routines are provided to enable the user to preform clean-up, roll-back, and recovery actions for an application that is being terminated.

2. It is illegal to resume the execution of an application from a termination handler.

Condition Tokens and Signaling

The invention provides a common methodology for the representation of a condition through the use of a common data type with the following properties:

self describing can be used as a return code can be signaled to a condition manager use can be deferred can be passed each token is condition specific has a 1 to 1 correspondence to the message describing the condition may optionally reference instance specific data.

The invention provides for a condition to be communicated via a 12-byte (96-bit) condition token data type. The return information (feedback code) from a callable service is an instance of this data type. The advantages of the condition token data type include:

A condition handler can be established to process return information from called services. This method frees the programmer from coding invoke then check type of calls. Instead, a centralized location would be used to handle return information.

As a shared data type among all callable services, it ties these components.

A message that can be displayed logged in a file is associated with each instance of a condition.

As a feedback code, it can be stored or logged for later processing.

To support code portability among platforms, symbolic names (in those languages which support symbolic names) can be equated to define feedback codes and hardware conditions.

To reduce the amount of overhead, and lack of completeness associated with the traditional call method of 'invoke then check,' a method is provided to direct the condition token data as input to a Condition Manager. This method is the following:

On the CALL statement to the service routine, the caller has the option of passing an address parameter for a feedback code.

Critical conditions (severity=4) are always signaled to a Condition Manager.

If this parameter is supplied and the result of the service is not critical, a feedback code is returned to the caller.

If the parameter is not supplied and the result of the called service is not totally successful (condition=0), the called service signals the Condition Manager, passing the condition token.

If the parameter is not supplied and the result of the called service is completely successful, the service just returns.

To use the optical parameter method, a language must allow optical parameter on the CALL statement. In the case where a language does not allow optional parameters, the feedback code parameter is always coded by the caller. In this case special values may be defined to achieve the same effect as optional parameters. For example, placing a zero value in the address parameter can be used to trigger the method of signalling all conditions. This optional parameter allows a programmer to utilize the full power of the signalling method when and where it is beneficial, but it also allows the programmer to use the traditional call-check sequence and get the benefit of the use of the condition token.

The data objects used for this condition representation will now be defined.

The Condition Token data type (CEECTOK) is used for communication with Message Services, Condition Management, callable services, and user applications. An instance can be built dynamically or, more typically, constructed statically.

An instance of a Condition Token is 12 bytes (96 bits) long and contains the following information (represented in C syntax):

```
struct CEECTOK {
    INT4    Condition_ID;
    BITS    Case:2;
    BITS    Severity:3;
    BITS    Control:3;
    CHAR    Facility_ID[3];
    INT4    I_S_Info;
};
``` where:

Condition_ID

A 4-byte encoding of the identifier that, together with the Facility_ID, describes the condition. The Case field determines the type of identifier. Two identifiers are defined:

* Case 1 - Service Condition

Case 1 is used by callable services and most application programs.
Case 1 Condition_ID:
struct {
    INT2    MsgSev;
    INT2    Msgno;
} Condition_ID;

where:
MsgSev

A 2-byte, binary integer with the following possible values:

0 (I) Information only (or, if the entire token is zero, no information).

1 (W) Warning—service completed, probably correctly.

2 (E) Error detected—correction attempted; service completed, perhaps incorrectly.

3 (S) Severe error—service not completed.

4 (C) Critical error—service not completed; condition signaled.

Although the field is obviously capable of containing other values, these are not architected. If a critical error (severity=4) occurs during a callable service, it is always signaled to the Condition Manager, rather than returned synchronously to the caller.

Note: The severity designation from the CEECTOK is always used when displaying a message.

Msgno

A 2-byte, binary number that identifies the message associated with the condition. The combination of Facility_ID and Msgno uniquely identifies a condition.

Case 2—Class/Cause Code Condition

Can be used by some operating systems and compiler run-time libraries.

Case 2 Condition_ID:
struct {
    INT2    Class_Code;
    INT2    Cause_Code;
} Condition_ID;

where:
Class_Code

A 2-byte, binary number that identifies the message (same type as Msgno, above) associated with the class of the condition.

Cause_Code

A 2-byte, binary number that identifies the message (same type as Msgno, above) associated with the cause of the condition.

Facility_ID

A 3-character, alphanumeric string that identifies a product or component within a product. The Facility_ID is associated with the repository (for example, a file) of the run-time messages and when associated with a message number uniquely identifies a message within the repository. The conventions for naming the message repository, however, are platform-specific. The Facility_ID need not be unique within the system and can be determined by the application writer. When a product is initialized, it is responsible for determining that its message repository can be located by message services. Each platform has its own method for locating the message repository. For example, on OS/2, an environment variable; on VM/CMS, a file definition (FILEDEF); on MVS, a ddname can be used.

Note: The Msgno/Facility_ID identifies a condition for an enabled product. This identification is required to be persistent beyond the scope of a single session. This allows the meaning of the condition and its associated message to be determined after the session that produced the condition has ended.

Case

A 2-bit field that defines the format of the Condition_ID portion of the token. The value 1 identifies a case 1 condition, the value 2 identifies a case 2 condition. The value 0 is reserved for platform specific use and the value 3 has been reserved for future use.

Severity

A 3-bit field that indicates a condition's severity. Severity values are the same as defined under a case 1 Condition_ID. When evaluating the severity, the same rules apply for signaling case 2 conditions as for case 1 conditions.

Note: This field is valid for both case 1 and 2 conditions. It may be used with either condition token to evaluate the condition's severity.

For a case 1 condition, this field contains the same value as the Severity field in the Condition_ID.

Control

A 3-bit field containing flags that describe or control various aspects of condition handling, as follows:

..1  Indicates the Facility_ID has been assigned by the system software provider.

.1.  Reserved.

1..  Reserved.

I_S_Info

A 4-byte handle identifying the Instance Specific Information (ISI) associated with the given instance of the condition represented by the condition token in which it is contained. If an ISI is not associated with a given condition token, the I_s_Info field contains a value of binary zero.

See FIG. 9 for a block diagram of the structure CEECTOK. The bit numbering indicates the size of the fields and is not meant to indicate a particular bit position methodology. An example of C code to declare the structure CEECTOK is as follows:

```
struct CASE_1 {
    INT2    MsgSev;
    INT2    Msgno;
};
struct CASE_2 {
    INT2    Class_Code;
    INT2    Cause Code;
};
struct CEECTOK {
    union {
            CASE_1 Case_1;
            CASE_2 Case_2;
    } Condition_ID;
    BITS    Case:2;
    BITS    Severity:3;
    BITS    Control:3;
    CHAR    Facility_ID[3];
    INT4    L_S_Info;
};
```

A Feedback Code is an instance of a Condition Token (structure CEECTOK). A Feedback Code is returned from a service call if the caller has passed a reference to an area to hold it.

Instance Specific Information (ISI)

ISI definition: The Instance Specific Information (ISI) is made up of two types of data, both of which are unique to a specific occurrence of a given condition. This data is defined as follows:

1. information to be inserted into the message associated with the given condition (i.e., the message insert data).

2. information to be used by a condition handler to specifically identify and/or react to a given condition (i.e., condition qualifying data, "Q_Data").

The existence and/or use of, either or both of these information items is condition- and/or language- and/or application-specific. That is, a given message may or may not have a requirement for insert data. The existence, format, and use of condition qualifying data (Q_Data) is by cooperative convention between the signaler of the condition and the handler handling the condition. Because condition token is designed to be used across multiple platforms which may have widely varying pointer lengths, the 4 bytes used for ISI handle have not been defined as a pointer although it is possible that on some platforms it could in fact be a pointer. In a non-ESA MVS system, for example, the handle could be a 32 bit pointer. In general, it is defined as being information which identifies the location of the ISI data. Various standard programming techniques for making indirect references may be used.

The format and structure of the ISI is platform specific but, the ISI must contain the following data items:

ISI_Handle
ISI_Flags
Time-stamp
Q_Data_Token
Insert_Seq_Num_1, Insert_Data_Token
.
.

Insert_Seq_Num_n, Insert_Data_Token where:
ISI_Handle (INT4)
is a monotonically increasing number in the range of 1 to (2**31)−1 and is calculated at the process level and therefore serialization is required when obtaining a new ISI_Handle. (Note: Wrap-around is permitted but a severity 1 condition will be signaled.)
ISI_Flags (BITS:32)
is a 32-bit field containing indicators defined as follows:
..............................1
the application protection flag
..............................1.
the environmental protection flag (this flag is set and managed by the Condition Manager, it is set upon entry to the Condition Manager (to prevent the overwriting of a ISI associated with a condition that is active within the Condition Manager) and reset upon exit of the condition from active condition handling.)
..............................1..
cross enclave transition flag
Note: This flag is set to indicate that the associated condition token and its associated ISI will be passed across an enclave boundary.
all others
reserved and have a value of zero
Time-stamp (FLOAT8)
is the time-stamp indicating the time at which the ISI was created.
Q_Data_Token (INT4)
is a 32-bit data object used by a condition handler. This "data object" is a 32-bit item used to access the qualifying data.
Insert_Seq_Num (INT4)
a 4-byte integer containing the insert sequence number (e.g., insert 1, insert 2). It corresponds to that specified with an insert identifier in the message source file.
Insert_Data_Token (INT4)
is a 32-bit data object use by message services. This "data object" is a 32-bit item used to access the message insert data. (The insert data that is pointed to must be self-describing.)

The advantages of the condition token data type include:
As a feedback code, it can be stored or logged for later processing, and will provide a specific message.
The indicated severity is readily accessible to languages without bit-manipulation capability.

One of the uses of this invention is in the production of run-time messages that are associated with the condition represented by an instance of a CEECTOK.

Message processing is closely related to the conditions handling model that is chosen by a given application. Facilities are provided for the application programmer to have a choice of two condition handling models, determined by how the Services are called. The following is an overview of how message processing will occur with the use of each of these two condition handling models and the use of the condition token (CEECTOK) representing a condition:

Message Processing with FEEDBACK_CODEs returned to the caller:

When the application is coded to receive FEEDBACK_CODEs from a Service and a condition is detected by the called service, the following sequence of events can occur:

The service will build a condition token (structure CEECTOK) with a callable service.

The service will place any required message insert data and/or qualifying data into the Instance Specific Information area (ISI) through the use of callable services.

If the severity of the detected condition is critical (sev=4), the condition will be Signaled to the Condition Manager and processing will continue as described below for a Signalled condition.

If the severity of the condition is not critical (sev<4), processing will continue as follows:

The structure CEECTOK is returned to the caller of the service as a FEEDBACK_CODE.

The application, upon examining the FEEDBACK_CODE has the following options:

Ignore it and continue processing.

Store the condition representation (CEECTOK) for later processing.

Signal the condition to the Condition Manager.

Process the condition in line with application code. Among other things, this can involve the processing of the message that is associated with the structure CEECTOK. When processing the message, the application has the following options:

Use a callable service to get, format, and dispatch the message for display.

Acquire a storage area of sufficient size to contain the formatted message and use a callable service to get, format (with the insert data), and store the message in the storage area.

The application may save the message for processing or dispatch it for display.

Message processing with no FEEDBACK —CODE on the CALL and all detected conditions are signaled to the Condition Manager:

When an application chooses to have all conditions Signaled to the Condition Manager, or the condition detected is of critical severity, or the application explicitly signals a condition, the following sequences of events may occur in relation to message processing:

The services that detected the condition builds the structure CEECTOK for the condition.

The service will place any required message insert data and/or qualifying data into the Instance Specific Information area (ISI) through the use of a callable service.

The detected condition signaled to the Condition Manager and the structure CEECTOK is passed to the Condition Manager.

The Condition Manager will process the condition as described by the application.

If the Condition Manager or a Condition Handler determines that the message representing the current condition is to be retrieved, formatted, and dispatched for display, it has done through the use of a callable service.

If during the processing of a condition, a new condition is detected, the Condition Manager will build a new CEECTOK with a new instance of a ISI for the new/promoted condition, thus preventing the loss of message insert data for nested or promoted conditions. Message processing may then be accomplished through the use of a callable service.

Condition Conventions for Synchronous Conditions: The CEE callable services interact with the condition architecture as follows:

1. CEE callable services report information about the success or failure of a request in the form of a feedback code (structure CEECTOK data type). This information may be used by the CEE Condition Manager or Message Services.

2. A feedback code area may be passed by reference to the service as the last argument. This is an optional argument on the CALL statement and its presence or absence affects the process as follows:

Critical conditions (severity=4) are always signaled directly to the Condition Manager.

For non-critical conditions (severity= or <3), the condition token may be returned to the caller as a feedback code.

If the feedback code area argument was not passed and the results of the called function are other than totally successful (condition=0), the condition token is passed to the CEE Condition Manager by signaling a condition.

Note: To use the optional argument method, a CEE-enabled language must allow optional arguments on the CALL statement. Where a language does not support optional arguments, the feedback code argument is always coded by the caller.

3. The condition architecture supports four cases of formats of the structure CEECTOK, depending on the type of condition. The preferred embodiment defines only two cases:

a. Case 1—Service Condition b. Case 2—Class/Cause Code

4. All four types of conditions have the following property:

5. If the first four bytes (Condition_ID) of the token are all (binary) zero, then the next eight bytes are also zero. This condition token represents complete success.

When more than one case of condition token can be encountered, the first four bytes of the token should be checked first for success. If the token does not indicate a successful condition, the case field should be examined next.

6. To be able to test for success easily, callers should define at least the first four bytes as binary numbers. However, supplying only the first four bytes is invalid; languages that cannot define the condition token as a structure can use a three-element one-dimensional array.

COBOL Example of a Case 1 Condition_ID

1 Feedback Pic ×(12)

1 Feedback-Detail Redefines Feedback.

2 Severity Comp Pic 9999.

2 Message-Id Comp Pic 9999.

FORTRAN Example of a Case 1 Condition_ID

Integer*2 Feedback(6), Severity, Message_Id

Equivalence (Severity, Feedback(1)), (Message_Id, Feedback(2))

APPLICATION WRITERS INTERFACES (AWI)

The callable services CEESGL raises, or signals, a condition to the Condition Manager, provides qualifying data for this instance of the condition, and optionally creates Instance Specific Information for this condition. Each enabled signaled condition (of severity 2 or above) increments the error count by one. If the error count becomes equal or exceeds the error count limit (determined by the ERRCOUNT run-time option) the condition manager will terminate the enclave without signaling Termination_Imminent. Promoted conditions do not increment the error count.

Severity 0 and 1 conditions are considered 'safe' conditions, which are conditions that should be ignored if they are not handled and no feedback token was passed when the condition was raised.

The CEESGL externally callable subroutine interface is defined using C syntax as follows:

```
void CEESGL (cond_rep, [q_data_token], [fc]);
```

| | | |
|---|---|---|
| FEED_BACK | *cond_rep, | |
| INT4 | *q_data_token, | |
| FEED_BACK | *fc; | | where:
cond_rep (input)
A condition representation that is passed by reference.
q_data_token (input/optional)
A 32-bit data object to be placed in the Instance Specific Information for use in accessing the qualifying data associated with the given instance of the condition.
fc (output/optional)
An optional condition token passed by reference that indicates the success or failure of CEESGL.
Conditions returned in fc:

| | |
|---|---|
| CEE000 | Severity = 0 |
| | Msg_No = n/a |
| | Message = The service completed successfully. |
| CEE069 | Severity = 0 |
| | Msg_No = 0201 |
| | Message = The signaled condition was not handled. |
| CEE0EE | Severity = 3 |
| | Msg_No = 0462 |
| | Message = ISI associated with the input condition token was not found. |
| CEE0EB | Severity = 3 |
| | Msg_No = 0459 |
| | Message = Insufficient storage available to create a new ISI. |
| CEE0EC | Severity = 3 |
| | Msg_no = 0460 |
| | Message = ISI list is full and unable to create a new entry. |
| CEE0CE | Severity = 1 |
| | Msg_No = 0398 |
| | Message = Resume with new input. |
| CEE0CF | Severity = 1 |
| | Msg_No = 0399 |
| | Message = Resume with new output. |

Usage Notes:

1. The caller of the CEESGL service must populate the ISI with any insert data (required for formatting the message associated with the condition being raised) prior to making the call to this service. When receiving a feedback code from a callable service, the MIB is already populated.

2. Enablement is determined for conditions raised with this service.

3. The q_data_token is not interrogated by CCH. It can be any value that can be contained within 4 bytes.

4. If a condition is signaled passing a value of q_data_token on the call to CEESGL and a q_data_token value already exists in the associated ISI, the q_data_token in the ISI will be overwritten.

5. The conditions CEE0CE and CEE0CF, in conjunction with the data pointed to by q_data_token, are used by the routine that experienced the condition to fix-up and/or resume.

CEE Condition Representation provides the following AWI callable services:

CEENCOD—Constructs an instance of a condition token data type.

CEEDCOD—Decomposes a condition token data type into its component parts.

| CEENCOD - Construct a Condition Token |
|---|
| void CEENCOD (C_1,C_2,Case,Severity,Control, Facility_ID,Cond_Token,[fc]); |
| INT2  *C_1; |
| INT2  *C_2; |
| INT2  *Case; |
| INT2  *Severity; |
| INT2  *Contrl, |
| char  (*Facility_ID)[3]; |
| INT2  *Control; |
| struct  CEECTOK *Cond_Token; |
| FEED_BACK *fc; | where:
C_1 (input)
A 2-byte binary integer representing the value of the first 2 bytes of the Condition_ID.
For case 1, this is the Severity; for case 2, it is the Class_Code.
C_2 (input)
A 2-byte binary integer representing the value of the second 2 bytes of the Condition_ID.
For case 1, this is the Msg_No; for case 2, it is the Cause_Code.
Case (input)
A 2-byte binary integer that defines the format of the Condition_ID portion of the token. The value 1 identifies a case 1 condition, a value of 2 identifies a case 2 condition. The values 0 and 3 are reserved.
Severity (input)
A 2-byte binary integer that indicates the condition's severity. For case 1 conditions, the value of this field is the same as in the Condition_ID.
For case 1 and 2 conditions, this field may always be used to test the condition3 s severity.
Control (input)
A 2-byte binary number containing the condition's control information as defined earlier.
Facility_ID (input)
A 3-character field containing three alphanumeric characters that identify the product generating this condition or feedback.
In a case 2 condition, where the Condition_ID may indicate 2 messages, and both messages may require insert data, the caller will load the insert data into the storage area in the order of insertion for the first message followed by the data required for the second message. Message Services will treat these as a pair of messages and use the same Message Insert Block (CEEMIB) for both messages.
Cond_Token (output)
The 8-byte representation of the constructed condition or feedback information.
fc (output/optional)
An optional 8-byte feedback code passed by reference. If specified as an argument, feedback information (a condition token) is returned to the calling routine. If omitted and the requested operation was not successfully completed, the condition is signaled to the Condition Manager.
The following symbolic conditions may result from this service:

| | |
|---|---|
| CEE000 | Severity = 0<br>Msg_No = n/a<br>Message = The service completed successfully. |
| CEE0CH | Severity = 3<br>Msg_No = 0401<br>Message = Invalid case code found. |
| CEE0CJ | Severity = 3<br>Msg_No = 0403<br>Message = Invalid severity code found. |
| CEE0CI | Severity = 3<br>Msg_No = 0402<br>Message = Invalid control code found. |
| CEE0E4 | Severity = 3<br>Msg_No = 0452<br>Message = Invalid facility_id code found. |

```
CEEDCOD - Decompose a Condition Token
    void CEEDCOD (Cond_Token,C_1,C_2,Case,Severity,Control,Facility_ID,[fc]);
        CEECTOK      *Cond_Token,
        INT2         *C_1,
        INT2         *C_2,
        INT2         *Case,
        INT2         *Severity,
        INT2         *Control,
        CHAR3        *Facility_ID,
        FEED_BACK *fc;
``` where:
Cond_Token (input)
An 8-byte condition token (CEECTOK) representing the current condition or feedback information.
C_1 (output)
A 2-byte binary integer representing the value of the first 2 bytes of the Condition_ID.
C_2 (output)
A 2-byte binary integer representing the value of the second 2 bytes of the Condition_ID.
Case (output)
A 2-byte binary integer field that defines the format of the Condition_ID portion of the token. A value of 1 identifies a case 1 condition. A value of 2 identifies a case 2 condition. The values 0 and 3 are reserved.
Severity (output)
A 2-byte binary integer representing the severity of the condition.
Control (output)
A 16-bit field containing flags describing aspects of the state of the condition.
Facility_ID (output)
A 3-character field containing three alphanumeric characters identifying the product generating the condition or feedback information.
fc (output/optional)
An optional 8-byte feedback code passed by reference. If specified as an argument, feedback information (condition token) is returned to the calling routine. If not specified as an argument and the requested operation was not successfully completed, the condition is signaled to the Condition Manager.
The following symbolic conditions may result from this service:

| | |
|---|---|
| CEE000 | Severity = 0<br>Msg_No = n/a<br>Message = The service completed successfully. |
| CEE036 | Severity = 3<br>Msg_No = 0102<br>Message = Invalid condition token was passed. |

COMPILER WRITERS INTERFACES (CWI)

CEE provides a CWI that is IBM System/370 specific that will construct a condition token given a facility id and a message number. The name of the service is CEEGETFB.

CEEGETFB—Construct a Condition Token given a facility id and a message number: CEEGETFB constructs a case 1 condition token given a facility id and a message number. The severity will be retrieved from the appropriate message file containing the message number.

```
void CEEGETFB (facility_id, message_no, cond_token, [fc]);
    CHAR3        *facility_id,
    INT4         *message_no,
    CEECTOK      *cond_token,
    FEED_BACK *fc;
``` where:
Cond_Token (output)
A case 1 style 8-byte condition token (CEECTOK) that is constructed from the facility_id, message_no, and the severity which is obtained from the appropriate file containing the message definition.
message_no (input)
A 4-byte binary integer representing the message number for the resulting condition token.
facility_id (input)
The 3 character facility id that will be placed into the resulting condition token. It will be used to determine the file containing the message definition and message text.
fc (output/optional)
An optional 8-byte feedback code passed by reference. If specified as an argument, feedback information (condition token) is returned to the calling routine. If not specified as an argument and the requested operation was not successfully completed, the condition is signaled to the Condition Manager.
The following symbolic conditions may result from this service:

| | |
|---|---|
| CEE000 | Severity = 0<br>Msg_No = n/a<br>Message = The service completed successfully. |
| CEE0EA | Severity = 3<br>Msg_No = 0458<br>Message = The message repository cannot be |

|       | located. |
|-------|----------|
| CEE3CT | Severity = 3 |
|        | Msg_No = 3485 |
|        | Message = message_no could not be found within the library specified. |
| CEE0CJ | Severity = 3 |
|        | Msg_No = 0403 |
|        | Message = Invalid severity code found. |

Using the foregoing specifications a Common Condition Handler and a set of compilers utilizing the applicants' invention may be implemented using standard programming techniques. The resulting program(s) may be stored on disk, diskettes, memory cards, ROM or any other memory device. For execution, the program may be copied into the RAM of the computer. One skilled in the art of computer science will easily be able to combine the software created as described with appropriate general purpose or special purpose computer hardware to create a system for executing programs. While the preferred embodiment of the present invention has been illustrated in detail, it should be apparent that modifications and adaptations to that embodiment may occur to one skilled in the art without departing from the scope of the present invention as set forth in the following claims.

What is claimed is:

1. A method for handling conditions in a computer system, the conditions occurring during execution of a program including routines prepared in a plurality of computer programming languages (a multi-language thread), comprising the steps of:

(a) initializing a condition processing means to turn over control of the computer system to a means for managing cooperatively condition handlers for said multi-language thread while preserving a language semantic of an executing routine, procedure, or function (a Common Condition Handler (CCH) when a condition occurs;

(b) queuing a plurality of language specific condition handlers (LSH) as a program routines are initialized, each LSH being associated with a separate stack frame of each separate program routine and corresponding to the language in which the separate program routine is written;

(c) queuing one or more user condition handler routines (User Handlers) as requested by the program with each being associated with a stack frame;

(d) detecting occurrence of a condition and determining a current stack frame, then executing a last queued LSH for the current stack frame to determine whether the condition is enabled and resuming execution of the program if the condition is not enabled;

(e) executing the User Handlers for the current stack frame in queue order beginning with the last queued User Handler until one of the User Handlers indicates that the condition has been handled or until the queue is empty;

(f) executing the last queued LSH for the current stack frame to handle the condition if none of the User Handlers handled the condition; and (g) applying semantics of the high level language of the routine, procedure or function where the condition occurred to handle the condition if the condition needs to be handled after each queue of User Handlers and each queued LSH associated with the stack had an opportunity to handle the condition.

2. The method of claim 1, further comprising the step of repeating steps (e) and (f) for each stack frame moving downward in the stack until the condition is handled.

3. A method for handling conditions in a computer system, the conditions occurring during execution of a program including routines prepared in a plurality of computer programming languages (a multi-language thread), comprising the steps of:

(a) initializing a condition processing means to turn over control of the computer system to a means for managing cooperatively condition handlers for said multi-language thread while preserving a language semantic of an executing routine, procedure, or function (a Common Condition Handler (CCH) when a condition occurs;

(b) queuing a plurality of language specific condition handlers (LSH) as a program routines are initialized, each LSH being associated with a separate stack frame of each separate program routine and corresponding to the language in which the separate program routine is written;

(c) queuing one or more user condition handler routines (User Handlers) as requested by the program with each being associated with a stack frame;

(d) detecting occurrence of a condition and determining a current stack frame, then executing a last queued LSH for the current stack frame to determine whether the condition is enabled and resuming execution of the program if the condition is not enabled;

(e) executing the User Handlers for the current stack frame in queue order beginning with the last queued User Handler until one of the User Handlers indicates that the condition has been handled or until the queue is empty;

(f) executing the last queued LSH for the current stack frame to handle the condition if none of the User Handlers handled the condition;

(g) applying semantics of the high level language of the routine, procedure or function where the condition occurred to handle the condition if the condition needs to be handled after each queue of User Handlers and each queued LSH associated with the stack had an opportunity to handle the condition;

(h) accepting return information from one or more of the Handlers requesting that the condition be redefined as a second condition (Promote Request); and (i) processing the Promote Request by executing a Handler and passing the second condition to the Handler.

4. The method of claim 3, further comprising the steps of:

(a) accepting return information from one or more of the Handlers requesting that the condition be reprocessed by a second condition Handler (Percolate Request) and (b) processing the Percolate Request.

5. The method of claim 4, further comprising the steps of:

(a) accepting return information from one or more of the Handlers requesting that execution be resumed in the code where the condition originated (Resume Request); and (b) processing the Resume Request.

6. The method of claim 1, the queuing step for User Handlers further comprising the step of calling an external entry point in the CCH.

7. The method of claim 1, further comprising the steps of:

(a) registering a termination routine with the CCH to be executed when termination occurs;

(b) executing the termination routine, responsive to the occurrence of termination as a result of a condition.

8. A method for handling conditions in a computer system, the conditions occurring during execution of a program including routines prepared in a plurality of computer programming languages (a multi-language thread), comprising the steps of:

(a) initializing a condition processing means to turn over control of the computer system to a means for managing cooperatively condition handlers for said multi-language thread while preserving a language semantic of an executing routine, procedure, or function (a Common Condition Handler (CCH) when a condition occurs;

(b) queuing a plurality of language specific condition handlers (LSH) as a program routines are initialized, each LSH being associated with a separate stack frame of each separate program routine and corresponding to the language in which the separate program routine is written;

(c) queuing one or more user condition handler routines (User Handlers) as requested by the program with each being associated with a stack frame;

(d) detecting occurrence of a condition and determining a current stack frame, then executing a last queued LSH for the current stack frame to determine whether the condition is enabled and resuming execution of the program if the condition is not enabled;

(e) executing the User Handlers for the current stack frame in queue order beginning with the last queued User Handler until one of the User Handlers indicates that the condition has been handled or until the queue is empty;

(f) executing the last queued LSH for the current stack frame to handle the condition if none of the User Handlers handled the condition;

(g) applying semantics of the high level language of the routine, procedure or function where the condition occurred to handle the condition if the condition needs to be handled after each queue of User Handlers and each queued LSH associated with the stack had an opportunity to handle the condition;

(h) saving a Resume Cursor when the condition occurs;

(i) accepting return information when a Handler to the CCH requesting that the Resume Cursor be changed to a new value;

(j) changing the Resume Cursor to the new value; and (k) transferring control to the instruction pointed to by the Resume Cursor.

9. The method of claim 8, further comprising the steps of:

(a) determining whether the new value of the Resume Cursor moves past a stack frame; and (b) unregistering any Handlers associated with a stack frame which has been moved past.

10. A method for operating a compiler for a computer programming language which creates object code for programs in a computer system using multiple computer programming languages (a multi-language thread) comprising the steps of:

(a) creating initialization object code which branches to an external entry point of a means for managing cooperatively condition handlers for the multi-language thread while preserving a language semantic of an executing routine, procedure, or function (a Common Condition Handler (CCH) to identify a language specific condition handler (LSH);

(b) preparing object code for an LSH which when called by the CCH for a condition will:

(1) accept a parameter having at least a first and second values;

(2) return information to the CCH when the parameter equals the first value which indicates whether the condition is enabled;

(3) handle selected conditions related to the computer programming language when the parameter equals the second value and return information to the CCH which indicates whether the condition is handled (Resume Request), whether the condition should be changed to a new value (Promote Request), and whether the condition should be passed to another condition handler (Percolate Request); and (c) storing the object code in a persistent memory for subsequent execution as a part of a program.

11. The method of claim 10, further comprising the steps of:

(a) generating object code for a termination routine to be executed when termination occurs; and (b) creating object code to register the termination routine the CCH to be executed responsive to the occurrence of termination.

12. The method of claim 10, further comprising the step of generating object code for requesting that the CCH change the Resume Cursor to the new value.

13. The method of claim 10, further comprising the steps of:

(1) generating object code for accepting a third parameter value; and (2) generating object code for processing the condition according to the language defaults when the parameter equals the third parameter value.

14. A computer system using multiple computer programming languages (a multi-language thread) comprising:

(a) means for managing cooperatively condition handlers for said multi-language thread while preserving a language semantic of an executing routine, procedure or function (a Common Condition Handler (CCH));

(b) means for linking object code from source code including routines prepared in one or more computer programming languages with the CCH to produce an executable program;

(c) means for executing the program;

(d) means for initializing a condition processing means to turn over control of the computer system to the CCH when a condition occurs;

(e) means for queuing one or more language specific condition Handler (LSH) as routines are initialized, each routine having one LSH, which corresponds to the language in which the routine is written and which is associated with a stack frame;

(f) means for queuing one or more user condition handling routines (User Handler) as requested by the program with each being associated with a stack frame;

(g) means for detecting the occurrence of a condition and determining a current stack frame, and for executing a last queued LSH for the current stack frame to determine whether the condition is enabled and resuming executing of the program if the condition is not enabled;

(h) means for executing the User Handlers for the current stack frame in queue order beginning with the last queued User Handler until one of the User Handlers indicates that the condition has been handled or until the queue is empty;

(i) means for executing the last queued LSH for the current stack frame to handle the condition if none of the User Handlers handled the condition; and (j) means for applying semantics of the high level language of the routine, procedure or function where the condition occurred to handle the condition if the condition needs to be handled after each queue of User Handlers and each queued LSH associated with the stack had an opportunity to handle the condition.

15. A computer system using multiple computer programming languages (a multi-language thread) comprising:

(a) means for managing cooperatively condition handlers for said multi-language thread while preserving a language semantic of an executing routine, procedure or function (a Common Condition Handler (CCH));

(b) means for linking object code from source code including routines prepared in one or more computer programming languages with the CCH to produce an executable program;

(c) means for executing the program;

(d) means for initializing a condition processing means to turn over control of the computer system to the CCH when a condition occurs;

(e) means for queuing one or more language specific condition Handler (LSH) as routines are initialized, each routine having one LSH, which corresponds to the language in which the routine is written and which is associated with a stack frame of the routine;

(f) means for queuing one or more user condition handling routines (User Handler) as requested by the program with each being associated with a stack frame;

(g) means for detecting the occurrence of a condition and determining a current stack frame, and for executing a last queued LSH for the current stack frame to determine whether the condition is enabled and resuming executing of the program if the condition is not enabled;

(h) means for executing the User Handlers for the current stack frame in queue order beginning with the last queued User Handler until one of the User Handlers indicates that the condition has been handled or until the queue is empty;

(i) means for executing the last queued LSH for the current stack frame to handle the condition if none of the User Handlers handled the condition;

(j) means for applying semantics of the high level language of the routine, procedure or function where the condition occurred to handle the condition if the condition needs to be handled after each queue of User Handlers and each queued LSH associated with the stack had an opportunity to handle the condition;

(k) means for accepting return information from one or more of the Handlers requesting that the condition be redefined as a second condition (Promote Request); and (l) means for processing the Promote Request by executing a Handler and passing the second condition to the Handler.

16. The system of claim 15, further comprising:

(a) means for accepting return information from one or more of the Handlers requesting that the condition be reprocessed by a second condition Handler (Percolate Request); and (b) means for processing the Percolate Request.

17. The system of claim 16, further comprising:

(a) means for accepting return information from one or more of the Handlers requesting that execution be resumed in the code where the condition originated (Resume Request); and (b) means for processing the Resume Request.

18. The system of claim 14, wherein the queuing means for Using Handlers further comprises means for calling an external entry point in the CCH.

19. The system of claim 14, further comprising:

(a) means for registering a termination routine with the CCH to be executed when termination occurs; and (b) means for executing the termination routine, responsive to the occurrence of termination as a result of a condition.

20. A computer system using multiple computer programming languages (a multi-language thread) comprising:

(a) means for managing cooperatively condition handlers for said multi-language thread while preserving a language semantic of an executing routine, procedure or function (a Common Condition Handler (CCH));

(b) means for linking object code from source code including routines prepared in one or more computer programming languages with the CCH to produce an executable program;

(c) means for executing the program;

(d) means for initializing a condition processing means to turn over control of the computer system to the CCH when a condition occurs;

(e) means for queuing one or more language specific condition Handler (LSH) as routines are initialized, each routine having one LSH, which corresponds to the language in which the routine is written and which is associated with a stack frame of the routine;

(f) means for queuing one or more user condition handling routines (User Handler) as requested by the program with each being associated with a stack frame;

(g) means for detecting the occurrence of a condition and determining a current stack frame, and for executing a last queued LSH for the current stack frame to determine whether the condition is enabled and resuming executing of the program if the condition is not enabled;

(h) means for executing the User Handlers for the current stack frame in queue order beginning with the last queued User Handler until one of the User Handlers indicates that the condition has been handled or until the queue is empty;

(i) means for executing the last queued LSH for the current stack frame to handle the condition if none of the User Handlers handled the condition;

(j) means for applying semantics of the high level language of the routine, procedure or function where the condition occurred to handle the condition if the condition needs to be handled after each queue of User Handlers and each queued LSH associated with the stack had an opportunity to handle the condition;

(k) means for saving a Resume Cursor when a condition occurs;

(l) means for accepting return information from a Handler to the CCH requesting that the Resume Cursor be changed to a new value;

(m) means for changing the Resume Cursor to the new value; and (n) means for transferring control to the instruction pointed to by the Resume Cursor.

21. The system of claim 20, further comprising:

(a) means for determining whether the new value of the Resume Cursor moves past a stack frame; and (b) means for unregistering any Handlers associated with a stack frame which has been moved past.

22. A system for compiling a computer programming language which creates object code for programs which use a means for managing cooperatively condition handlers for routines prepared in a plurality of computer programming languages (a multi-language thread) while preserving a language semantic of an executing routine, procedure, or function (a Common Condition Handling (CCH) in a computer system comprising:

(a) means for creating initialization object code which branches to a CCH external entry point to identify a language specific condition handler (LSH);

(b) means for preparing object code for an LSH capable of being called by the CCH when a condition occurs, the LSH including:

(1) means for accepting a parameter having at least first and second values;

(2) means for returning information to the CCH when the parameter equals the first value which indicates whether the condition is enabled;

(3) means for handling selected conditions related to the computer programming language when the parameter equals the second value and for returning information to the CCH which indicates whether the condition is handled (Resume Request), whether the condition should be changed to a new value (Promote Request), and whether the condition should be passed to another condition handler (Percolate Request); and (c) means for storing the object code in a memory for subsequent execution as a part of a program.

23. The system of claim 22, further comprising:

(a) means for generating object code for a termination routine to be executed when termination occurs; and (b) means for creating object code to register the termination routine with the CCH to be executed responsive to the occurrence of termination.

24. The system of claim 22, further comprising means for generating object code for requesting that the CCH change the Resume Cursor to the new value.

25. The system of claim 22, further comprising:

(1) means for accepting a third parameter value; and (2) means for processing the condition according to the language defaults when the parameter equals the third parameter value.

26. A method for handling conditions in a computer system, the conditions occurring during execution of a program including routines prepared in a plurality of computer programming languages (a multi-language thread), said method comprising:

queuing a plurality of high level language (HLL) condition handlers, each HLL condition handler being associated with a separate stack frame of each separate routine and corresponding to the high level language in which the separate routine is written;

managing cooperatively condition handling among said handlers, where said multi-language thread includes a stack frame based conditions handling model and a global error table condition handling model, including executing the handlers in a queued order and allowing a handler to at least a) present a condition to a different handler (percolate), to b) to replace the condition with a new condition and to present the new condition to another handler (promote), or c) to handle the condition (resume); and applying semantics of the high level language of the routine where the condition occurred to handle the condition if the condition needs to be handled after each HLL condition handler associated with the stack had an opportunity to handle the condition.

27. The method of claim 26 wherein said multi-language thread includes a PL/I programming language routine having a stack frame based condition handling model and a Fortran programming language routine having a global error table condition handling model.

28. The method of claim 26 wherein said multi-language thread includes a PL/I programming language routine having a stack frame based condition handling model and a C programming language routine having a global error table condition handling model.

29. The method of claim 26 further comprising deferring termination of said program when one of said conditions occur during execution of one of said routines in said program until each HLL condition handler on the stack has an opportunity to handle the condition.

30. The method of claim 28 further comprising determining enablement of the condition by the HLL condition handler associated with the routine where the condition occurred before executing any of the queue of handlers.

31. The method of claim 26 further comprising associating a queue of user condition handlers with each of the separate stack frames wherein said queue may be empty for any one of said stack frames but at least one stack frame has a non-empty queue.

32. The method of claim 31 further comprising a step of enabling said handlers to optionally defer condition handling to a next handler in a same stack frame or defer condition handling to a first handler in a next calling stack frame.

33. The method of claim 32 wherein the next handler is a next user handler if said next user handler exists, and wherein the next handler is the HLL condition handler for said stack frame if said next user handler is non existent.

34. The method of claim 32 wherein the next handler is a first user handler in said queue in said next calling stack frame if said first user handler exists, and wherein the first handler is the associated HLL condition handler for said next calling stack frame if said first user handler is non existent in said next calling stack frame.

35. The method of claim 31 further comprising a step of enabling the user condition handlers and the HLL condition handlers to point to any location existing on said stack to resume execution.

36. A computer system comprising:

means for handling conditions in a computer system, the conditions occurring during an execution of a program including routines prepared in a plurality of computer programming languages (a multi-language thread), where said multi-language thread includes a stack frame based condition handling model and a global error table condition handling model;

means for queuing a plurality of high level language (HLL) condition handlers, each HLL condition handler being associated with a separate stack frame of each separate routine and corresponding to the high level language in which the separate routine is written;

means for managing cooperatively condition handling among said handlers including executing the handlers in a queued order and allowing a handler to at least a) present a condition to a different handler (percolate), or b) to replace the condition with a new condition and to present the new condition to another handler (promote), or c) to handle the condition (resume); and means for applying semantics of the high level language of the routine where the condition occurred to handle the condition if the condition needs to be handled after each HLL condition handler associated with the stack had an opportunity to handle the condition.

37. The system of claim 36 further comprising means for determining enablement of the condition by the HLL condition handler associated with the routine where the condition occurred before executing any of the queue of handlers.

38. The computer system of claim 36 further comprising means for deferring termination of said program when one of said conditions occur during execution of one of said routines in said program until each HLL condition handler on the stack has an opportunity to handle the condition.

39. The computer system of claim 36 further comprising means for associating a queue of user condition handlers with each of the separate stack frames wherein said queue may be empty for any one of said stack frames but at least one stack frame has a non-empty queue.

40. The computer system of claim 39 further comprising means for enabling said handlers to optionally defer condition handling to a next handler in a same stack frame or defer condition handling to a first handler in a next calling stack frame.

41. The computer system of claim 40 wherein the next handler is a next user handler if said next user handler exists, and wherein the next handler is the HLL condition handler for said stack frame if said next user handler is non existent; and wherein the first handler is a first user handler in said queue in said next calling stack frame if said first user handler exists, and wherein the first handler is the associated HLL condition handler for said next calling stack frame if said first user handler is non existent in said next calling stack frame.

42. The computer system of claim 39 further comprising means for enabling the user condition handlers and the HLL condition handlers to point to any location existing on said stack to resume execution.

43. An article of manufacture, for use in a computer system, comprising:

means for causing a handling of conditions in a computer system, the conditions occurring during an execution of program including routines prepared in a plurality of computer programming languages (a multi-language thread), where said multi-language thread includes a stack frame based condition handling model and a global error table condition handling model;

means for causing a queuing of a plurality of high level language (HLL) condition handlers, each HLL condition handler being associated with a separate stack frame of each separate routine and corresponding to the high level language in which the separate routine is written;

means for causing a managing cooperatively of condition handling among said handlers including causing an execution of the handlers in a queued order and allowing a handler to at least a) present a condition to a different handler (percolate), or b) to replace the condition with a new condition and to present the new condition to another handler (promote), or c) to handle the condition (resume); and means for applying semantics of the high level language of the routine where the condition occurred to handle the condition if the condition needs to be handled after each HLL condition handler associated with the stack had an opportunity to handle the condition.

44. The article of manufacture of claim 43 further comprising means for causing a deferring of termination of said program when one of said conditions occur during execution of one of said routines in said program until each HLL condition handler on the stack has an opportunity to handle the condition.

45. The article of manufacture of claim 43 further comprising means for causing an association of a queue of user condition handlers with each of the separate stack frames wherein said queue may be empty for any one of said stack frames but at least one stack frame has a non-empty queue.

46. The article of manufacture of claim 45 further comprising means for causing said handlers to optionally defer condition handling to a next handler in a same stack frame or defer condition handling to a first handler in a next calling stack frame.

47. The article of manufacture of claim 46 wherein the next handler is a next user handler if said next user handler exists, and wherein the next handler is the HLL condition handler for said stack frame if said next user handler is non existent; and wherein the first handler is a first user handler in said queue in said next calling stack frame if said first user handler exists, and wherein the first handler is the associated HLL condition handler for said next calling stack frame if said first user handler is non existent in said next calling stack frame.

48. The article of manufacture of claim 45 further comprising means for enabling the user condition handlers and the HLL condition handlers to point to any location existing on said stack to resume execution.

* * * * *